United States Patent [19]

Satoh et al.

[11] Patent Number: 5,378,064
[45] Date of Patent: Jan. 3, 1995

[54] CONTROL ROD DRIVING SYSTEM

[75] Inventors: Yoshifumi Satoh, Kawasaki; Akira Nakamura, Yokohama, both of Japan

[73] Assignee: Kabushiki Kaisha Toshiba, Kawasaki, Japan

[21] Appl. No.: 954,048

[22] Filed: Sep. 30, 1992

[30] Foreign Application Priority Data

Sep. 30, 1991 [JP] Japan .................. 3-251587
Feb. 24, 1992 [JP] Japan .................. 4-036146
Jun. 9, 1992 [JP] Japan .................. 4-149589

[51] Int. Cl.$^6$ ............................ G21C 7/06
[52] U.S. Cl. ....................... 376/230; 376/233
[58] Field of Search ........ 376/233, 223, 230, 232; 976/DIG. 124, DIG. 127

[56] References Cited

U.S. PATENT DOCUMENTS

| | | | |
|---|---|---|---|
| 3,597,939 | 8/1971 | Ripley | 376/233 |
| 3,720,580 | 3/1973 | Schabert et al. | 376/223 |
| 4,048,010 | 8/1977 | Eschenfelder | 376/223 |
| 4,092,213 | 5/1978 | Nishimura | 376/223 |
| 4,902,470 | 2/1990 | Dixon et al. | 376/333 |
| 4,929,412 | 5/1990 | Dixon et al. | 376/260 |
| 5,009,834 | 4/1991 | Tessaro | 376/232 |

FOREIGN PATENT DOCUMENTS 60-238785 11/1985 Japan .

*Primary Examiner*—Donald P. Walsh
*Assistant Examiner*—Chelliah Meena
*Attorney, Agent, or Firm*—Foley & Lardner

[57] ABSTRACT

A control rod driving system for controlling a reactor core disposed in a reactor pressure vessel comprises a control rod and a control rod driving mechanism. The control rod has an inner hollow portion extending in a longitudinal direction thereof and the control rod driving mechanism is inserted into the inner hollow portion of the control rod for driving the control rod.

12 Claims, 31 Drawing Sheets

CONTROL ROD DRIVING SYSTEM

BACKGROUND OF THE INVENTION

The present invention relates to a control rod driving system for adjusting the power of a nuclear reactor and of a boiling water reactor (BWR) in particular.

Running operation of a reactor is basically performed by adjusting a reactivity, and a reactor power plant can be entirely controlled by suitably controlling or adjusting the degree of the reactivity. Such control of the reactivity is mainly performed by inserting or withdrawing the control rod(s), generally composed of a neutron absorber, into or from a reactor core.

Particularly, in a BWR, a core is composed of one unit consisting of a cross-shaped control rod and four fuel assemblies disposed around blade portions of the cross shaped control rod, and in this sense, the control rod can be called control blade or control blades.

The reactivity is controlled or adjusted by inserting or withdrawing such a control rod into or from the reactor core, and such insertion or withdrawal of the control rod is carried out by a control rod driving mechanism through a connecting tube.

A conventional technology in this art field will be described hereunder with reference to FIGS. 40 to 43.

Referring to FIG. 40 showing an arrangement of a control rod driving mechanism 10 disposed in a reactor pressure vessel 1, the control rod driving mechanism 10 is disposed below a core 2 and a control rod 3 is inserted into the core 2 from the lower side thereof. In FIG. 40, a lefthand control rod 3 is now inserted into the core 2 and a righthand control rod 3 is now withdrawn from the core 2. The axial length of the control rod 3 is determined to be substantially equal to a height of the core 2 and is about 4 m (meters). The moving stroke of the control rod 3 is also about 4 m, and in order to ensure the stroke, the control rod driving mechanism 10 and a connection tube 11 each have a vertical length of about 4 m. Accordingly, the entire vertical length of the control rod 3 and the control rod driving mechanism 10 is about 12 m in an operational installation.

FIG. 41 is a schematic elevational section of a conventional control rod driving system for the BWR. In FIG. 41, the control rod driving mechanism 10 is disposed in a housing 4 constructed integrally with the reactor pressure vessel 1 by welding means, for example. A control rod guide tube 5 is mounted to an upper portion of the housing 4 and the control rod 3 is accommodated in the guide tube 5. The connection tube 11 of the control rod driving mechanism 10 is connected to the control rod 3 through a coupling member 12. A driving piston 13 is mounted to the lower end of the connection tube 11, and the piston 13 constitutes a piston-cylinder assembly together with a piston tube 14 and a cylinder tube 15.

When hydraulic pressure is applied to an insertion duct 16 disposed to a lower portion of the housing 4, a driving water is introduced through the cylinder tube 15 and the piston tube 14 and then forces upward the lower surface of the driving piston 13, so that the connection tube 11 moves upward and the control rod 3 is thereby inserted into the core. The inserted control rod 3 is secured in its vertical position by engaging a collect finger 18 with a groove 17 formed on the outer surface of the connection tube 11.

When the control rod 3 is withdrawn from the core, a hydraulic pressure is applied to a withdrawal duct 19 mounted to the lower portion of the housing 4. AT this time, the driving water flows through the piston tube 14 and then into a portion between the piston tube 14 and the connecting tube 11 through a hole 20 formed in the upper portion of the piston tube 14, and finally presses downward the lower surface of the driving piston. A portion of the driving water passes between an outer tube 21 and the cylinder tube 15 to act on a collet piston 22 to thereby release the engagement between the collet finger 18 and the groove 17, whereby the control rod is withdrawn.

Mounting or dismounting of the control rod driving mechanism 10 to or from the reactor pressure vessel 1 will be described hereunder.

The control rod driving mechanism 10 is incorporated into the housing 4, from the lower side thereof, penetrating the reactor pressure vessel 1, and is secured to the reactor pressure vessel 1 by fastening the flanged portion 23 of the control rod driving mechanism 10 together with a flanged portion 6 of the housing 4 by means of bolts, for example. Accordingly, the mounting or dismounting of the control rod driving mechanism 10 can be carried out from the lower side of the reactor pressure vessel 1. Because of this arrangement, it is required to secure a wide space below the reactor pressure vessel 1 for downwardly withdrawing the control rod driving mechanism 10 having a length of about 4 m.

FIG. 42 is an illustration of the control rod guide tube 5 and elements or members associated with the guide tube 5. The control rod guide tube 5 acts to guide the vertical movement of the control rod 3 in an installed state and to support the weight of the fuel assembly 8 through a fuel support fitting 7. The control rod guide tube 5 is supported vertically at the upper end portion of the housing 4 and supported horizontally through a core support plate 9.

The control rod guide tube 5 is secured at its lower end in engagement with the top portion of a thermal sleeve 110, and this engagement is performed by relatively rotating the control rod guide tube 5 and the thermal sleeve 110. After the engagement therebetween, the control rod guide tube 5 and the thermal sleeve 110 are both fastened to prevent them from rotating to thereby completely couple them together. This fastening is done, as shown in FIG. 43, by means of a grooved lug 111 and a positioning pin 112 provided on the core support plate 9. The mounting or dismounting of the control rod guide tube 5 is performed from the upper side of the reactor pressure vessel 1.

As described above, the conventional control rod driving system including the control rod driving mechanism has a long vertical length of about 12 m in an extended condition and about 8 m even in a contracted condition. For this reason, in the conventional arrangement of a nuclear plant, the major portion of the control rod driving mechanism is disposed outside the reactor pressure vessel in the manner of penetrating the bottom thereof and without completely accommodating the mechanism into the reactor pressure vessel. Accordingly, when the control rod or the control rod driving mechanism is mounted to or dismounted from the lower side of the reactor pressure vessel, a large space is required for it, resulting in enlargement of a reactor building itself, which involves an increased construction cost. Moreover, in such an arrangement, the reactor pressure vessel is installed at a relatively high position, thus being disadvantageous for seismic resistance, for example.

Furthermore, the formation of the penetrating portion in the bottom of the reactor pressure vessel will provide problems such as the coolant in the reactor may leak externally therethrough, which is dangerous for persons who work at the lower portion of the reactor containment vessel when mounting or dismounting the control rod driving mechanism.

Still furthermore, it is necessary to exchange the piston cylinder mechanism periodically due to wear of the piston ring of the assembly, and with respect to this, there is also a problem for maintenance because such exchanging work requires the withdrawal of the control rod driving mechanism from the lower side of the reactor pressure vessel and the disassembly of the same.

SUMMARY OF THE INVENTION

A primary object of the present invention is to substantially eliminate defects or drawbacks encountered in the prior art and to provide a control rod driving system capable of shortening an entire extended axial length of a control rod and a control rod driving mechanism of the control rod driving system and achieving a construction cost reduction and an anti-earthquake characteristic, for example.

This and other objects can be achieved according to the present invention by providing a control rod driving system for controlling a reactor core disposed in a reactor pressure vessel comprising:

a control rod having an inner hollow portion extending in a longitudinal direction thereof; and a control rod driving mechanism to be inserted into the inner hollow portion of the control rod to drive the control rod.

In preferred embodiments, the control rod driving mechanism is disposed in the reactor pressure vessel. The control rod driving mechanism is arranged on a lower side of the reactor core. The control rod is inserted, upwardly in an installed state, into the reactor core from the lower side of the reactor core. The control rod may be inserted, downwardly in an installed state, into the reactor core from an upper side of the reactor core.

The control rod driving mechanism may be arranged on an upper side of the reactor core and the control rod is inserted downwardly, in an installed state, into the reactor core from the upper side of the reactor core.

The control rod driving mechanism is provided with a piston-cylinder mechanism driven by hydraulic pressure.

The control rod comprises a cylindrical tube having an inner hollow portion extending axially thereof and a neutron absorber mounted to an outer surface of the cylindrical tube so as to provide a cross-blade shade.

The control rod comprises upper and lower, in an installed state, cylindrical fixing members defining both axial ends of the control rod and a neutron absorber having a crossing blade shape and secured at upper and lower ends to outer portions of the upper and lower cylindrical fixing members, respectively, an axial portion between the upper and lower fixing members being defined as a hollow space.

The control rod driving mechanism comprises a hollow cylindrical coupling tube having an outer surface on which a plurality of grooves are formed along an axial direction with a predetermined interval and a latch mechanism to be engaged with the grooves of the coupling tube, the coupling tube being driven by hydraulic pressure and the coupling tube being inserted into substantially a central portion of the control rod. The latch mechanism is provided with pawls to be engaged with said grooves of the coupling tube.

The control rod driving mechanism further comprises an outer tube on which the coupling tube is mounted and an inner tube disposed inside the outer tube and further comprising a latch-releasing member connected to the outer tube for releasing a latch engagement of the latch mechanism. The outer tube and the inner tube are fixed at lower ends to a fixing member of the control rod driving mechanism.

The control rod driving system further comprises a control rod guide tube into which the control rod driving mechanism is arranged and the control rod guide tube has a lower end detachably secured to a bottom surface of the reactor pressure vessel and the guide tube is provided with an inner projecting portion and the fixing member is provided with an outer projecting portion which is engaged with the projected portion of the guide tube when the fixing member is inserted into the guide tube.

According to the structures and characters of the control rod driving system described above, one portion of the control rod driving mechanism can be accommodated in the control rod, so that the entire axial length of the control rod driving system can be shortened by about 4 m in comparison with a conventional system. Accordingly, it is possible to accommodate the control rod driving system itself in the reactor pressure vessel. Furthermore, the control rod driving mechanism can be mounted to or dismounted from the reactor pressure vessel by easy rotation working from the upper side of the reactor pressure vessel. The usage of the non-contact type piston sealing mechanism can reduce elements or members to be periodically exchanged.

According to the above characteristics, the following merits or advantages can be achieved.

1. A large space, which is required in the prior art, below the reactor pressure vessel is not required, resulting in the provision of the lower arrangement of the reactor pressure vessel, hence, as well as the reduction of the entire height of a reactor building, which further results in the lowering of a construction cost and improvement of the earthquake proof property.

2. The provision of through holes in the bottom portion of the reactor pressure vessel can be substantially eliminated, thus simplifying the structure of the reactor pressure vessel, resulting in the elimination of fear of possibility of the reactor coolant leakage.

3. Since the exchanging operation of the control rod driving mechanism can be performed remotely from the upper side of the reactor pressure vessel, the irradiation exposure dose to workers in the exchanging operation can be remarkably reduced.

4. Since elements or members which are to be periodically exchanged are substantially eliminated, the maintenance of the control rod driving mechanism can be made free. Accordingly, the numbers of the elements or members to be dismounted from the control rod driving mechanism at the periodical inspection can be minimized.

5. The provision of the non-contact type sealing mechanism and the pin roller makes it possible to reduce resistance against the vertical movement of the control rod, whereby the control rod can be withdrawn by its own weight, thus simplifying the mechanism therefor and enhancing the operational reliability.

The natures and further features of the present invention will be made more clear hereunder with reference to the following accompanying drawings.

DESCRIPTION OF THE PREFERRED EMBODIMENTS

A first embodiment of a control rod driving system according to the present invention will be described with reference to FIGS. 1 to 8.

Figure 1:
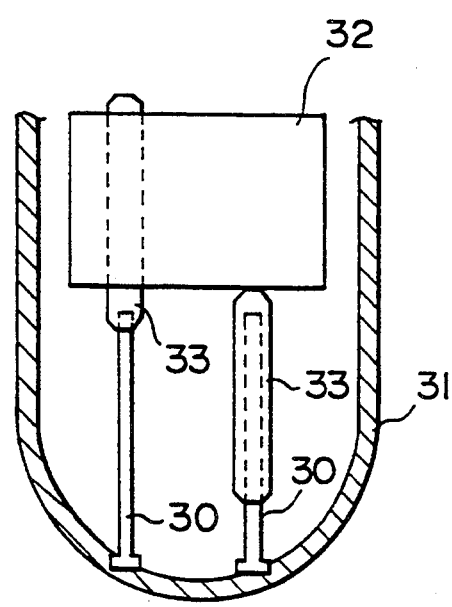
FIG. 1 is a schematic elevational arrangement of a first embodiment of a control rod driving system according to the present invention.

FIG. 1 is a schematic illustration of an arrangement of a core 32, a control rod 33 and a control rod driving mechanism 30 disposed in a reactor pressure vessel 31. The control rod 33 is inserted into the core 32 from the lower side thereof. In FIG. 1, the lefthand control rod 33 is inserted into the core 32 and the righthand control rod 33 is withdrawn from the core 32.

The control rod driving mechanism 30 is positioned at a lower side of the core 32. In this embodiment, the control rod 33 covers the control rod driving mechanism 30 in a vertically overlapped manner, so that the entire vertical length thereof can be remarkably shortened in comparison with the conventional arrangement, and accordingly, the control rod driving mechanism 30 can be arranged without penetrating the bottom portion of the reactor pressure vessel 31.

Figure 2:
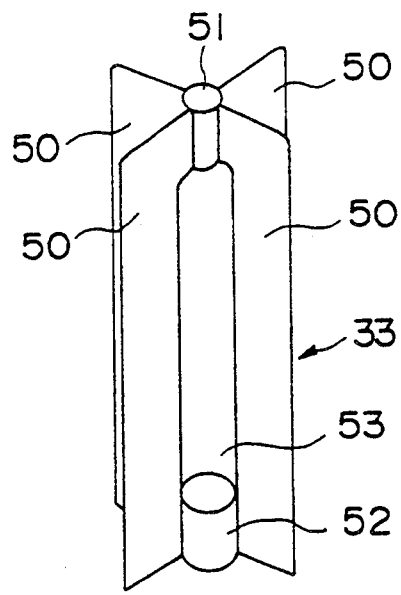
FIG. 2 is a perspective view, partially cut away, of a control rod driving mechanism and a control rod of the control rod driving system of FIG. 1.
Figure 2:
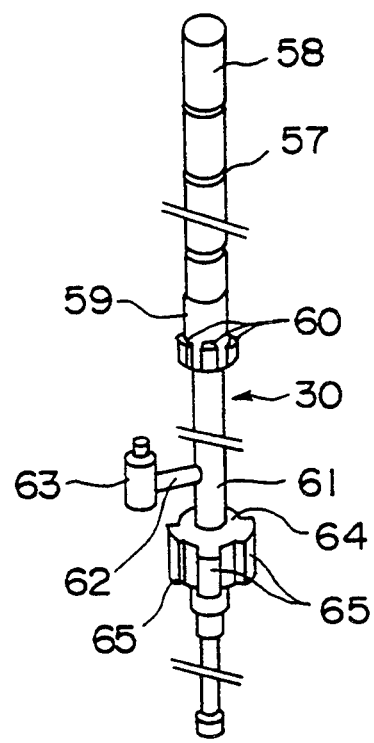

FIG. 2 shows the outer appearance of the control rod 33 and the control rod driving mechanism 30. As can be seen from this FIG. 2, the control rod 33 is composed of four neutron absorbing blade members 50 arranged in a cross shape and supported at its upper and lower portions by cylindrical fastening members 51 and 52, and an axial central portion between the upper and lower fastening members 51 and 52 is a hollow space 53. The lower fastening member 52 also acts as a combining member for the control rod driving mechanism 30. In this meaning, the control rod in the present invention may be called a control blade or a control blade assembly.

Figure 3:
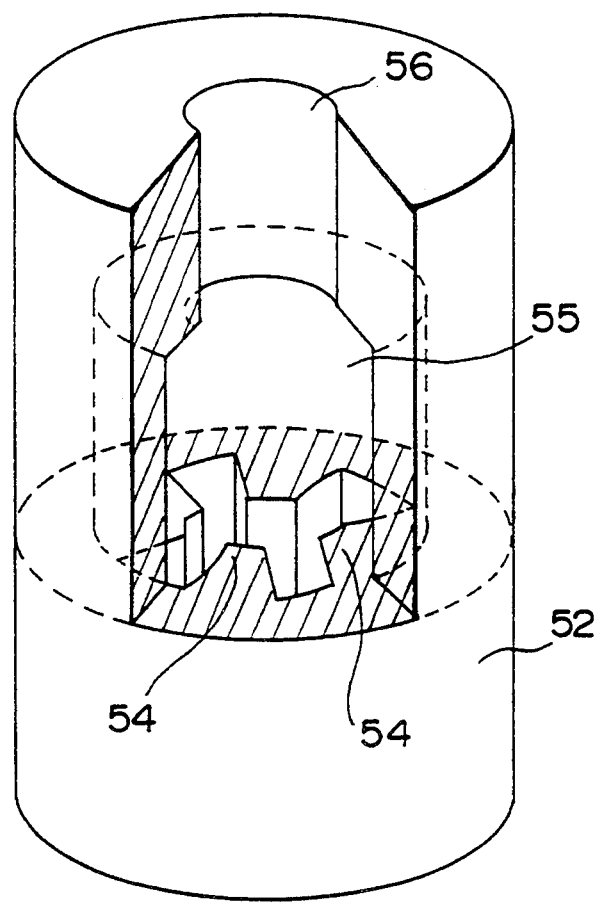
FIG. 3 is a perspective view, in an enlarged scale and partially cut away, of a lower cylindrical support member of the control rod of FIG. 2.

The lower fastening member 52 has a structure such as shown in FIG. 3, and the lower fastening member 52 has an inner hollow portion which is sectioned in a lower portion provided with a plurality of projections 54, an intermediate portion as an axial space and an upper portion as a cylindrical hole 56.

In FIG. 2, the control rod driving mechanism 30 has an upper end to which is mounted a cylindrical coupling tube 58 having an outer peripheral surface on which a plurality of ring-shaped grooves 57 are formed, and to the lower portion, as viewed, of the coupling tube 58 is mounted a connecting portion 59 to which are formed a plurality of projections 60 having shapes corresponding to the shape of the lower fastening member 52. The coupling tube 58 has a shape as if it covers the upper end of the outer tube 61.

A plurality of latch releasing mechanisms 63 are connected to the outer tube 61 of the lower portion of the control rod driving mechanism 30 through ducts 62, respectively, and each latch releasing mechanism 63 is arranged between two neutron absorbers 50. To a further lower portion of the latch releasing mechanisms 63 is mounted a fixing portion 64 of the control rod driving mechanism 30, the fixing portion 64 having a plurality of projections 65 on its outer surface.

With reference to FIG. 2, the coupling tube 58 is inserted into the central space 53 of the control rod 33. In this state, the upper portion of the coupling tube 58 is accommodated in the upper fastening member 51 of the control rod 33 and the connecting portion 59 is accommodated in the lower fastening member 52. In this state, when the control rod 33 and the control rod driving mechanism 30 are relatively rotated, the projections 60 of the connecting portion 59 are engaged with the lower fastening member 52, thus achieving a coupling between the control rod 33 and the control rod driving mechanism 30.

Figure 4:
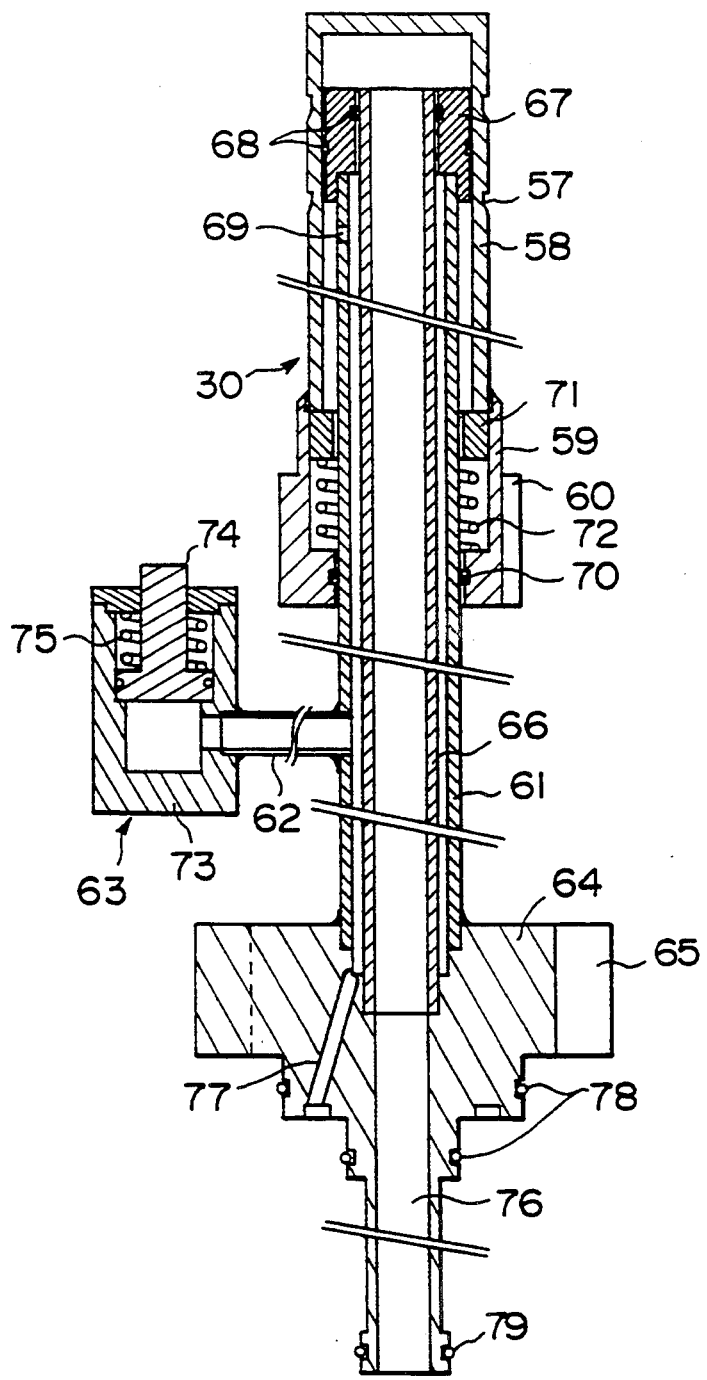
FIG. 4 is an elevational section of the control rod driving mechanism of the first embodiment.

Referring to FIG. 4, showing a schematic elevation of the control rod driving mechanism 30, it is provided with a piston-cylinder mechanism for hydraulically driving the control rod driving mechanism 30. The control rod driving mechanism 30 has an inner tube 66 disposed centrally and the outer tube 61 disposed outside the inner tube 66. Both the inner and outer tubes 66 and 61 are secured to the fixing portion 64 at their lower ends by means of welding.

To the upper end of the outer tube 61 is mounted a stop piston 67 to which seal rings 68 are applied to the inner and outer surfaces for preventing hydraulic pressure from leaking. A hole 69 is formed to the upper portion of the outer tube 61 so as to communicate with the coupling tube 58. As stated before, the coupling tube 58 provided with a plurality of grooves 57 is mounted to the outer tube 61 and a connecting portion 59 provided with a plurality of projections 60 is connected to the outer surface of the coupling tube 58.

A seal ring 70 is also disposed on the inner surface of the connecting portion 59 for sealing a hydraulic pressure, and a ring 71 and a spring 72 are further accommodated in the lower portion of the coupling tube 58 and the inside of the connecting portion 59. The latch releasing mechanisms 63, only one being illustrated, are mounted to the outer tube 61 through the ducts 62, and the latch releasing mechanism 63 constitutes a hydraulic piston-cylinder assembly in which a piston 74 and a spring 75 is accommodated in a cylinder 73, for example as illustrated.

The fixing portion 64 is provided with a plurality of projections 65, and an insertion passage 76 communicating with the inner tube 66 and a withdrawal passage 77 communicating the inner tube 66 and the outer tube 61 are also provided for the fixing portion 64. A seal ring 78 is disposed on the lower portion of the fixing portion 64 for attaining a sealing function at the fixing time of the control rod driving mechanism 30. The lower portion of the fixing portion 64 is constructed as a portion of a duct for the insertion passage 76 and a seal ring 79 is also disposed to this lower portion.

Figure 5:
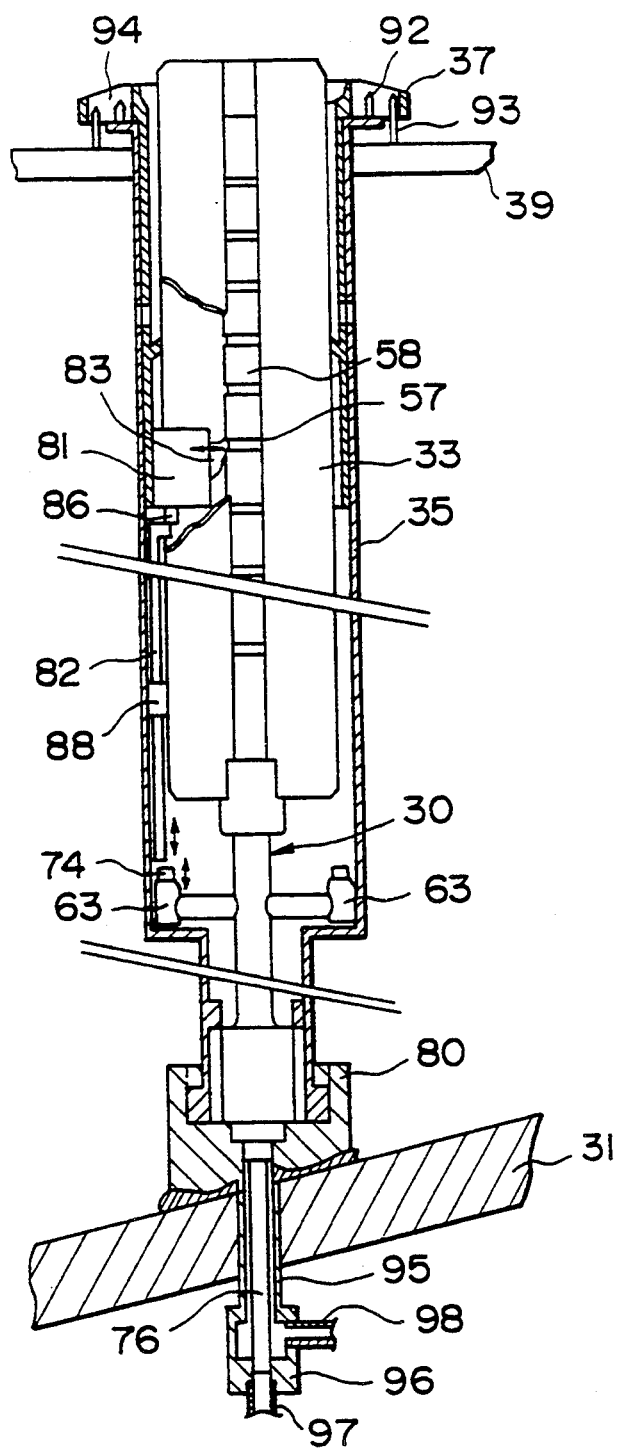
FIG. 5 is a view similar to FIG. 4, but showing a condition in which the control rod and the control driving mechanism are inserted into a control rod guide tube.
Figure 6:
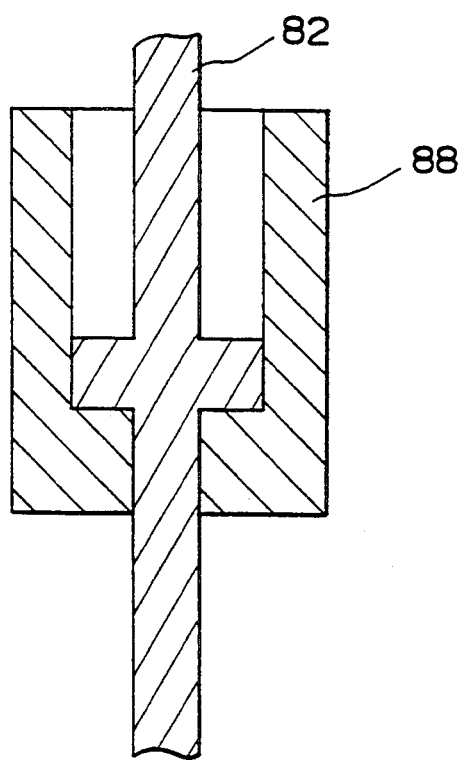
FIG. 6 shows an engagement of a fixing member and a latch releasing member of FIG. 5.

There is illustrated in FIG. 5 a positional relationship between the control rod 33, the control rod driving mechanism 30, the control rod driving mechanism support plate 80, the reactor pressure vessel 31, the core support plate 39, the control rod guide tube 35, the fuel support fitting 37, the latch mechanism 81 and the latch releasing rod 82, in an assembled state. In FIG. 5, the members and mechanisms are shown as sectional views except for the control rod 33, the control rod driving mechanism 30, the latch mechanism 81 and the latch releasing rod 82. FIG. 6 is a view showing a relationship between the latch releasing rod 82 and a fixing member 88 of FIG. 5.

Referring to FIGS. 5 and 6, the latch mechanism 81 is secured detachably in the same orientation as the lower portion of the fuel support fitting 37 and the latch releasing mechanism 63. A pawl 83 is ordinarily engaged with the groove 57 of the coupling tube 58 in a manner project from the latch mechanism 81 to thereby prevent the coupling tube 58 and the control rod 33 from falling down.

Figure 7:
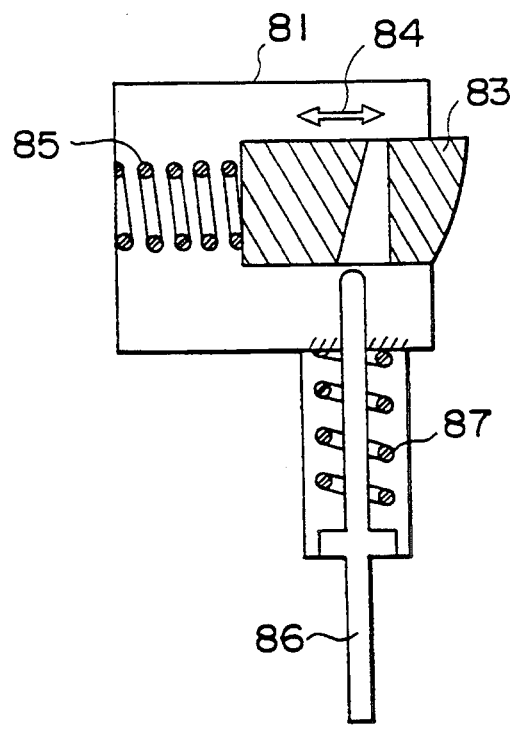
FIG. 7 is a sectional illustration showing a positional relationship between a latch mechanism and the control rod.

As schematically shown in FIG. 7, the latch mechanism 81 is assembled to be movable in an arrowed direction 84 and when a contacting portion of the pawl 83 is shifted to the outer surface of the coupling tube 58 from the groove 57 thereof, the spring 85 is contracted so as not to prevent the coupling tube 58 from moving upward.

Figure 8:
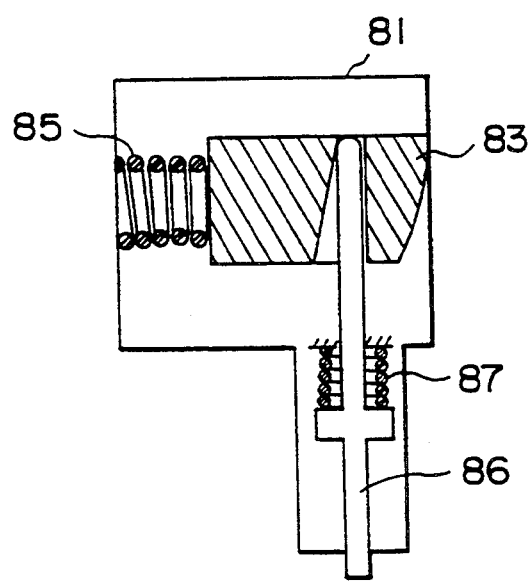
FIG. 8 is a view similar to FIG. 7, showing a condition in which the rod of FIG. 7 is inserted into a pawl.

The latch mechanism 81 includes, at its lower portion, a rod 86 which is usually urged to the lowermost portion of the latch mechanism 81 by a spring 87, but when the rod 86 is forced upward, the pawl 83 comes to be accommodated into the latch mechanism 81 as shown in FIG. 8.

As shown in FIG. 5, the latch releasing rod 82 extends vertically through the fixing member 88, and for example, as shown in FIG. 6, is constructed to be movable only in the upward direction as viewed. The fixing member 88 is secured to the inner surface of the control rod guide tube 35. The positional relationship between the latch mechanism 81, the latch releasing rod 82 and the latch releasing mechanism 63 is such that the latch releasing rod 82 is forcibly shifted upward by the raising of the piston 74, and the rod 86 of the latch mechanism 81 is further forced upward as shown in FIG. 8.

Figure 9:
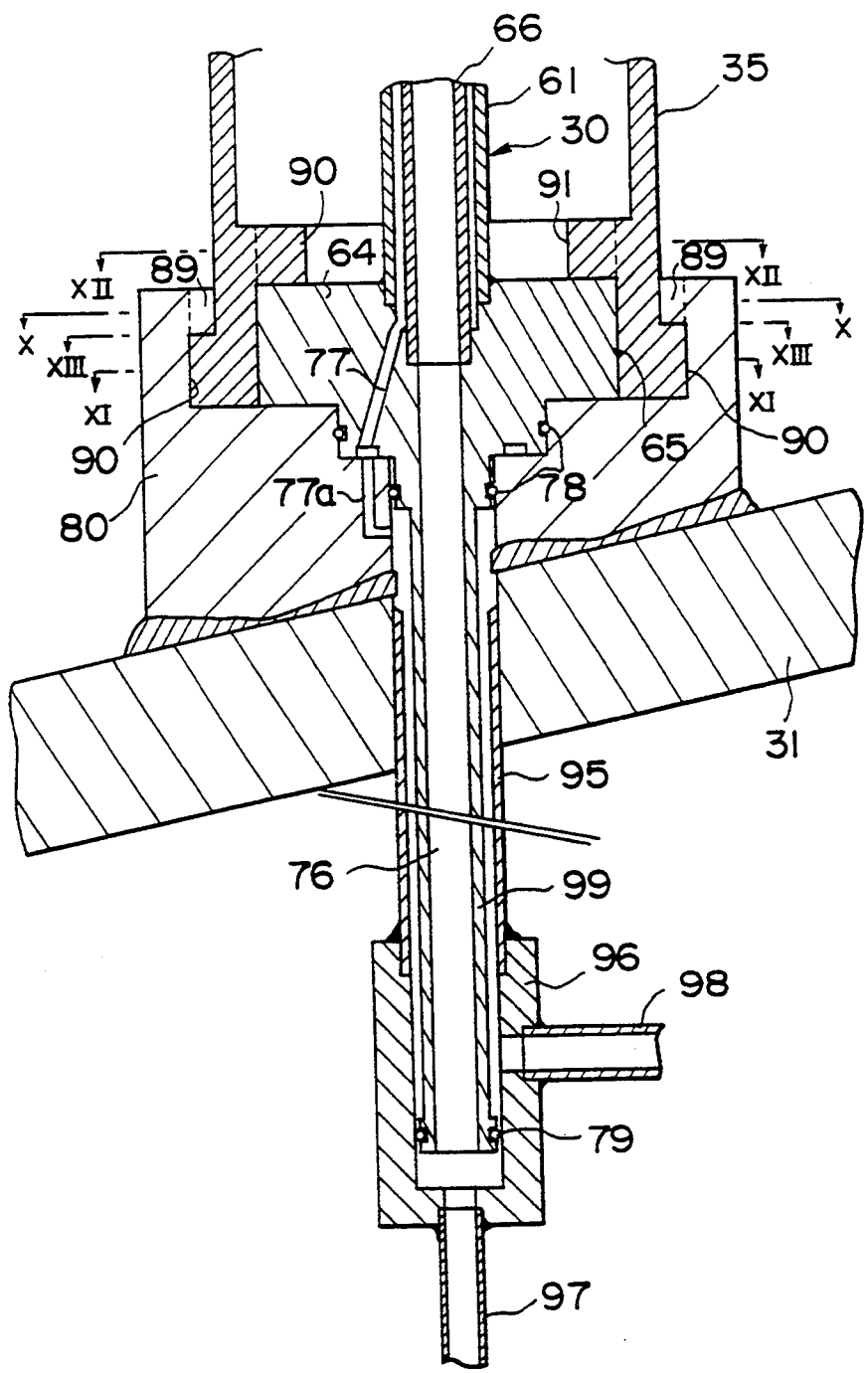
FIG. 9 is an enlarged sectional view of a support portion and a duct connection portion of the control rod driving mechanism of FIG. 5.

The control rod driving mechanism support plate 80 is provided on the inner surface of the bottom portion of the reactor pressure vessel 31, and FIG. 9 shows the detail of this control rod driving mechanism support plate 80. FIGS. 10 to 13 show sectional views of the control rod driving mechanism support plate 80, the control rod guide tube 35, and the control rod driving mechanism 30.

Figure 10:
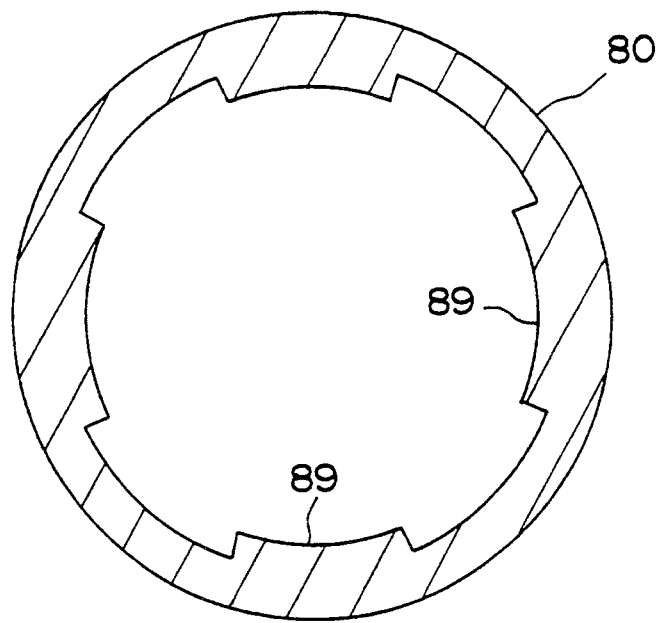
FIGS. 10 to 13 are sectional views taken along the lines X—X, XI—XI, XII—XII and XIII—XIII of FIG. 9, respectively.
Figure 11:
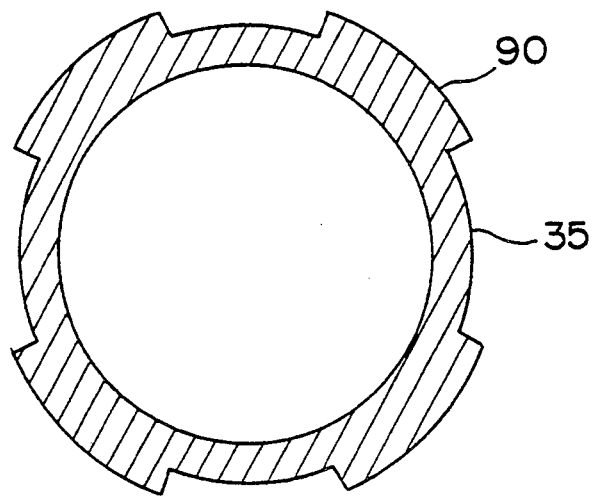

As shown in FIG. 10, the control rod driving mechanism support plate 80 has an inner hollow portion and a plurality of projections 89 are formed on the upper inside portion thereof. A plurality of projections 90 are also formed on the lower outside portion of the control rod guide tube 35 as shown in FIG. 11 so as to accord with the projections 89 of the control rod driving mechanism support plate 80. When the control rod guide tube 35 is fitted into the support plate 80 from the upper side thereof and then rotated, the projections 90 of the control rod guide tube 35 are engaged with the support plate 80, thus fixing the control rod guide tube 35 to the control rod driving mechanism support plate 80.

Figure 12:
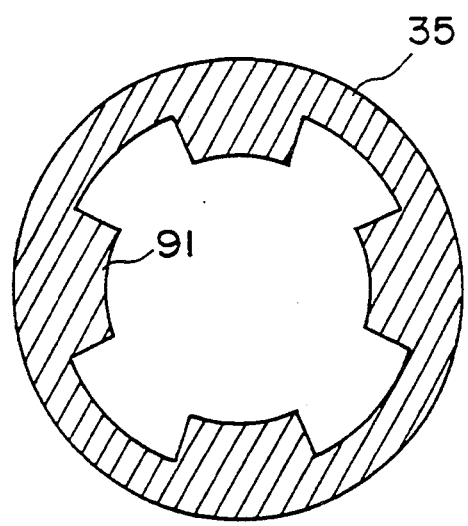
Figure 13:
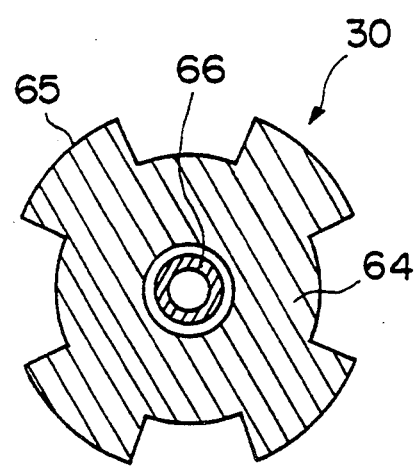

As shown in FIG. 12, a plurality of projections 91 are formed on the lower inside portion of the control rod guide tube 35. A plurality of projections 65 are formed on the outside of the fixing portion 64 of the control rod driving mechanism 30 so as to accord with the projections 91 of the control rod guide tube 35. When the control rod driving mechanism 30 is fitted into the control rod guide tube 35 from the upper side and then rotated, the projections 65 of the fixing portion 64 of the control rod driving mechanism 30 are engaged with the control rod guide tube 35, thus fixing the control rod driving mechanism 30 to the control rod guide tube 35.

Pins 92 are provided to the top end of the control rod guide tube 35, and pins 93 are also formed on the core support plate 39, both pins 92 and 93 extending vertically upward in the illustration of FIG. 5. The fuel support fitting 37 is mounted by fitting both the pins 92 and 93 to an elongated hole 94 formed in the fuel support fitting 37. In the manner described above, the entire positional relationship is complete.

As shown in FIG. 9, a duct or line 95 is connected to the reactor pressure vessel 31 and a duct connecting member 96 is mounted to the lower end portion of the duct 95. An insertion duct 97 and a withdrawal duct 98, both connected to a control rod driving water supply system, not shown, are connected to the duct connecting member 96.

As described hereinbefore, the control rod driving mechanism 30 is fixed by fitting the same into the control rod guide tube 35 and then rotating it. But this time, the fixing member 64 is fitted into the control rod driving mechanism support plate 80 and a portion of the pipe 99 having the shape and function for constituting the insertion passage 76 extends downward from the fixing member 64 and is accommodated in the duct 95 connected to the reactor pressure vessel 31. The seal ring 79 disposed at the lower end of this pipe 99 has a sealing function for sealing the driving water from the insertion duct 97 in the duct connecting portion 96 and the driving water from the withdrawal duct 98. Furthermore, the control rod driving mechanism support plate 80 is provided with a guide hole 77a for establishing the communication of the driving water from the withdrawal duct 98 to the withdrawal passage 77.

The control rod driving system of the structure described above will attain the following functions.

With reference to FIG. 4, when the control rod 33 is inserted, the driving water flows through the insertion passage 76. The driving water then passes the inner tube 66 and acts on the upper end of the coupling tube 58 to force upward the same and hence force upward the control rod 33. In a reactor emergency stop, i.e. scram, a highly pressurized driving water flows through the insertion passage 76, whereby the control rod 33 is rapidly raised and the coupling tube 58 compresses the spring 72 at the stroke end, thus moderating the operation.

When the control rod 33 is lowered downwards, the driving water flows through the withdrawal passage 77. The driving water then passes between the inner tube 66 and the outer tube 61 and is branched so that one part passes the duct 62 to act on the piston 74 of the latch releasing mechanism 63 to force upward the piston 74, thus releasing the latched. The other part of the driving water passes the hole 69 formed in the upper portion of the outer tube 61 to act on the connecting portion 59, whereby the control rod 33 connected to the coupling tube 58 is lowered.

According to the above first embodiment of the present invention, a portion of the control rod driving mechanism can be accommodated in the inside of the control rod. The total vertical length of the control rod and the control rod driving mechanism can be reduced by about 4 m in comparison with the structure of the prior art, and accordingly, the control rod driving mechanism can be itself accommodated in the reactor pressure vessel. Furthermore, the mounting and dismounting of the control rod driving mechanism can be performed by an easy rotating operation from the upper side of the reactor pressure vessel.

In addition, as the result of the above characteristic feature of the present invention, the following merits or advantages will be attained.

(1) A large space is not required for the lower portion of the reactor pressure vessel as is required in the prior art, and the installation height of the reactor pressure vessel, hence the reactor building, can be reduced, resulting in a construction cost reduction and an improvement of the earthquake-proof quality of the structure.

(2) The bottom portion of the reactor pressure vessel is provided with only a small hole for a hydraulic tube or is provided with no such hole. Therefore the structure of the bottom portion of the reactor pressure vessel can be simplified, thereby preventing the leakage of the reactor coolant which may be caused through removal of the control rod driving mechanism, as in the prior art.

(3) Since the exchanging operation of the control rod driving mechanism can be remotely performed from the upper side of the reactor pressure vessel, the radiation exposure dose to workers at the exchanging time can be remarkably reduced in comparison with the prior technology.

A second embodiment according to the present invention will be next described hereafter with reference to FIGS. 14 to 23, in which the arrangement of the second embodiment in the reactor is the same as that shown in FIGS. 1 to 3, so that the arrangement is not specifically described hereafter and in which like reference numerals are added to elements or portions corresponding to those of the first embodiment.

Figure 14:
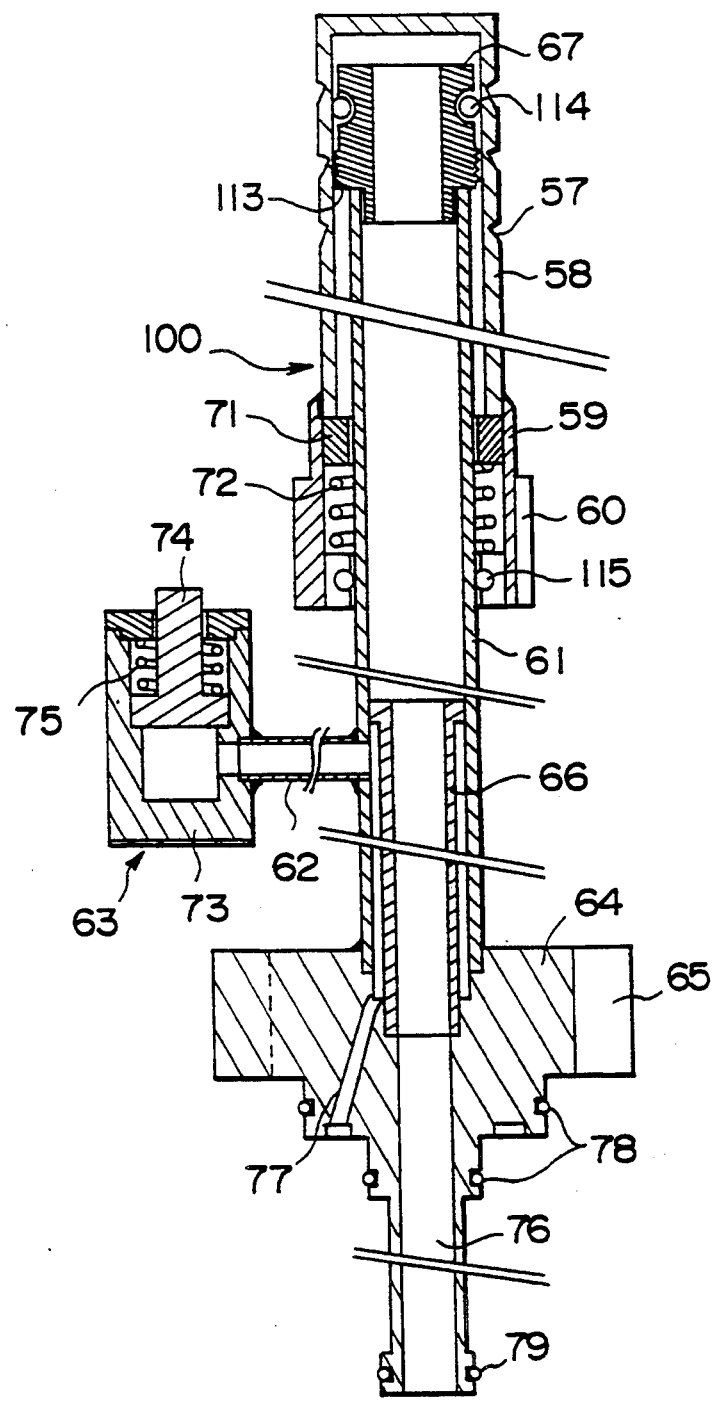
FIG. 14 is an elevational section of a control rod driving mechanism according to a second embodiment of the present invention.

FIG. 14 shows a schematic elevation of a control rod driving mechanism 100 for a BWR, in which the control rod driving mechanism 100 is provided with a piston-cylinder mechanism for hydraulically driving the control rod driving mechanism 100. In the control rod driving mechanism 100, the outer tube 61 is centrally arranged and the inner tube 66 is disposed inside the outer tube 61. The lower end portions of both the outer and inner tubes are fixed to the fixing portion 64 by welding means, for example.

The stop piston 67 is attached to the upper portion of the outer tube 61, and a labyrinth seal 113 as a non-contact type seal structure is provided for the outer surface of the stop piston 67 to seal the hydraulic pressure. Since this labyrinth seal is non-contact type, there is no fear of degradation due to wearing of the seal structure, thus substantially eliminating periodical exchanging thereof. Pin rollers 114 and 115 are disposed at the stop piston 67 and below the coupling tube 58, respectively, and the coupling tube 58 is guided by these rollers and then vertically moved along the outer tube 61.

By the adoption of the non-contact type labyrinth seal 113 and the pin rollers 114 and 115, no sliding or slid portion exists during the movement of the coupling tube 58, so that the movement of the coupling tube 58 can be made with substantially no resistance and the coupling tube 58 can be moved smoothly.

The coupling tube 58 is provided with a plurality of grooves 57 formed on its outer surface, and the connecting portion 59 having a plurality of projections 60 is provided for the coupling tube 58. The ring 71 and the spring 72 are accommodated in the lower portion of the coupling tube 58 and in the connecting portion 59. To the outer tube 61 is connected the latch releasing mechanism 63 through the duct 62, and the latch releasing mechanism 63 constitutes a hydraulic piston mechanism, for example, in which the piston 74 and the spring 75 are accommodated in the cylinder 73.

A plurality of projections 65 are provided for the fixing portion 64. The insertion passage 76 communicated with the inner tube 66 and the withdrawal (latch releasing) passage 77 communicated between the inner tube 66 and the outer tube 61. A plurality of seal rings 78 for a sealing function at the time of fixing the control rod driving mechanism 100 are mounted on the lower portion of the fixing portion 64. The lower portion of the fixing portion 64 has a shape and function as a portion of a duct constituting the insertion passage 76, and the seal ring 79 is mounted to the lower end of the insertion passage 76.

Figure 15:
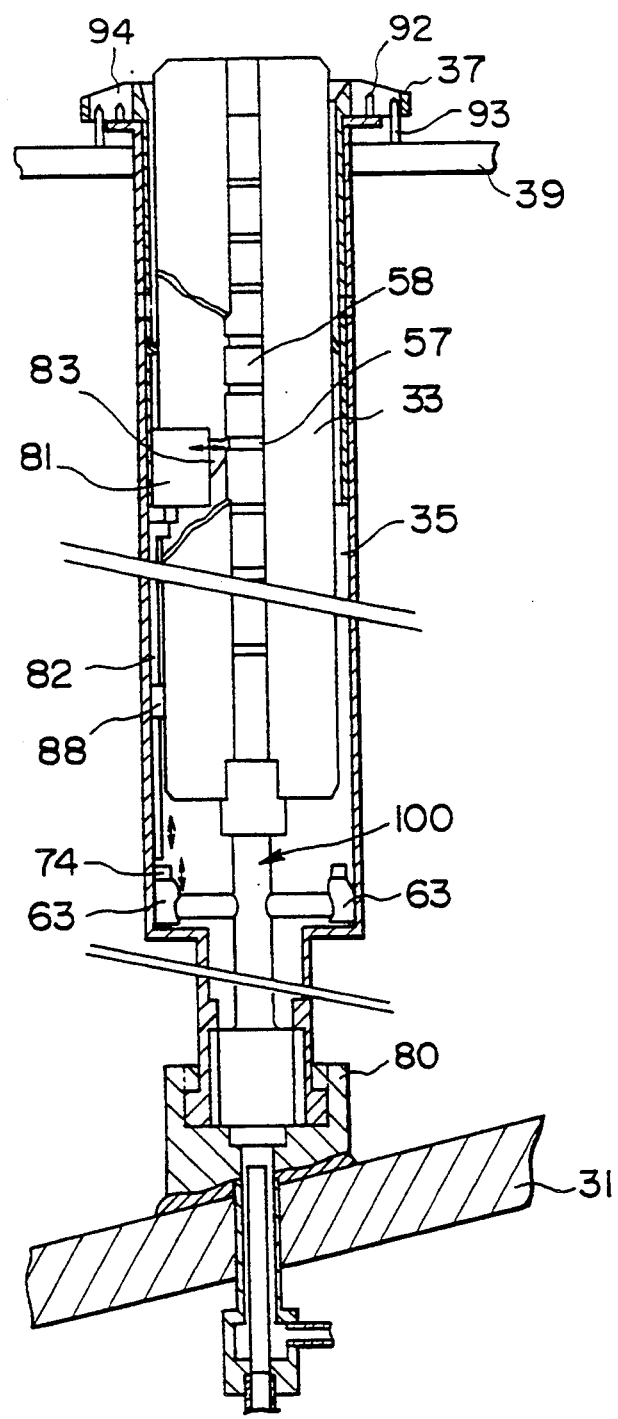
FIG. 15 is a view similar to that of FIG. 5, but relating to the second embodiment of FIG. 14.
Figure 16:
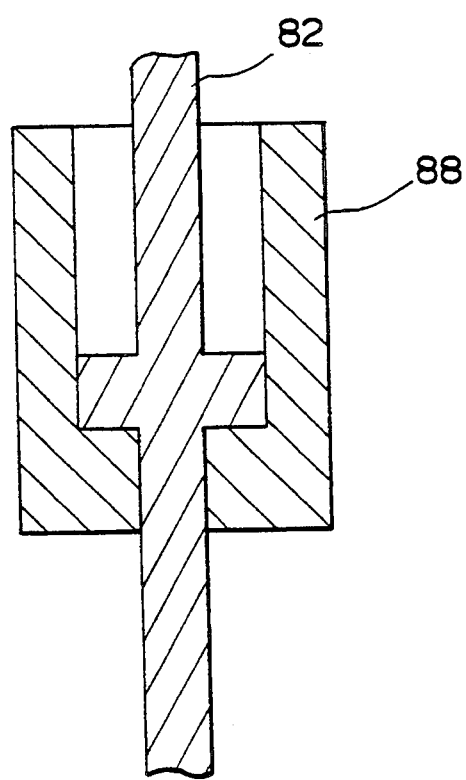
FIGS. 16 to 18 are views similar to those of FIGS. 6 to 8, but relating to the second embodiment of FIG. 14.

There is illustrated in FIG. 15 a positional relationship among the control rod 33, the control rod driving mechanism 100, the control rod driving mechanism support plate 80, the reactor pressure vessel 31, the core support plate 39, the control rod guide tube 35, the fuel support fitting 37, the latch mechanism 81 and the latch releasing rod 82, in an assembled state. In FIG. 15, the members and mechanisms are shown in sectional view except for the control rod 33, the control rod driving mechanism 100, the latch mechanism 81 and the latch releasing rod 82. FIG. 16 is a view showing a relationship between the latch releasing rod 82 and a fixing member 88 of FIG. 15 on an enlarged scale.

Referring to FIGS. 15 and 16, the latch mechanism 81 is secured detachably in the same orientation as the lower portion of the fuel support fitting 37 and the latch releasing mechanism 63. A pawl 83 is ordinarily engaged with the groove 57 of the coupling tube 58 in a manner to project from the latch mechanism 81 to thereby prevent the coupling tube 58 and the control rod 33 from falling down.

Figure 17:
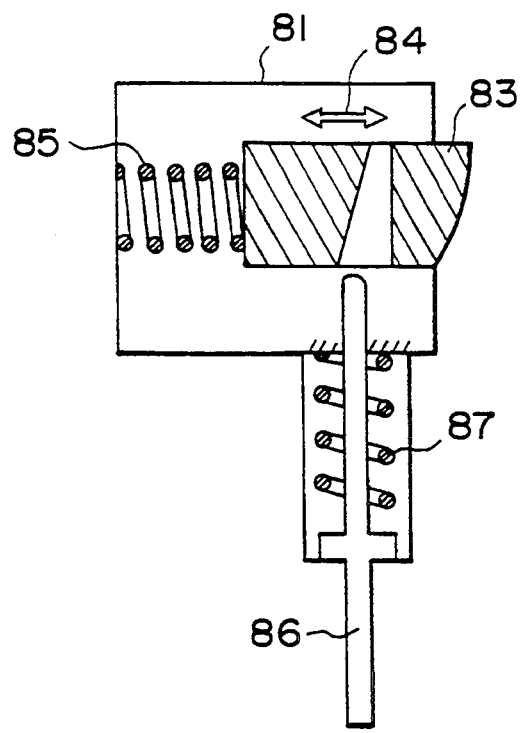

As schematically shown in FIG. 17, the latch mechanism 81 is assembled to be movable in an arrowed direction 84 and when a contacting portion of the pawl 83 is shifted to the outer surface of the coupling tube 58 from the groove 57 thereof, the spring 85 is contracted so as not to prevent the coupling tube 58 from moving upward.

Figure 18:
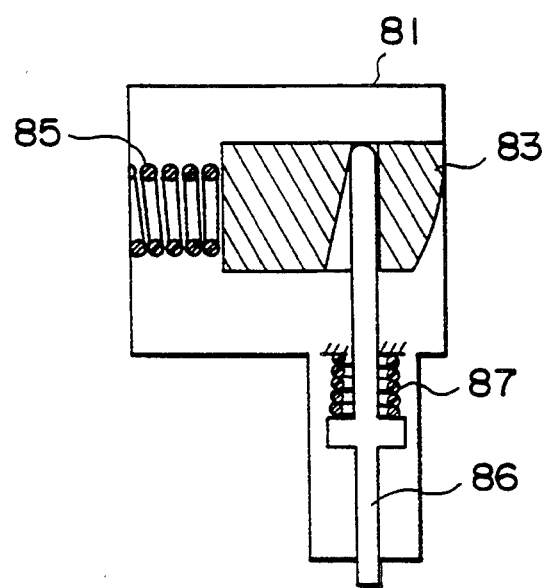

The latch mechanism 81 includes at its lower portion a rod 86 which is usually urged to the lowermost portion of the latch mechanism 81 by a spring 87, but when the rod 86 is forced upward, the pawl 83 is accommodated in the latch mechanism 81 as shown in FIG. 18.

As shown in FIG. 15, the latch releasing rod 82 extends vertically through the fixing member 88, and for example, as shown in FIG. 16, is constructed to be movable only in the upward direction as viewed. The fixing member 88 is secured to the inner surface of the control rod guide tube 35. The positional relationship between the latch releasing rod 82 and the latch releasing mechanism 63 in the latch mechanism 81 is made so that the latch releasing rod 82 is forcibly shifted upward by the raising of the piston 74 and the rod 86 of the latch mechanism 81 is further forced upward as shown in FIG. 18.

Figure 19:
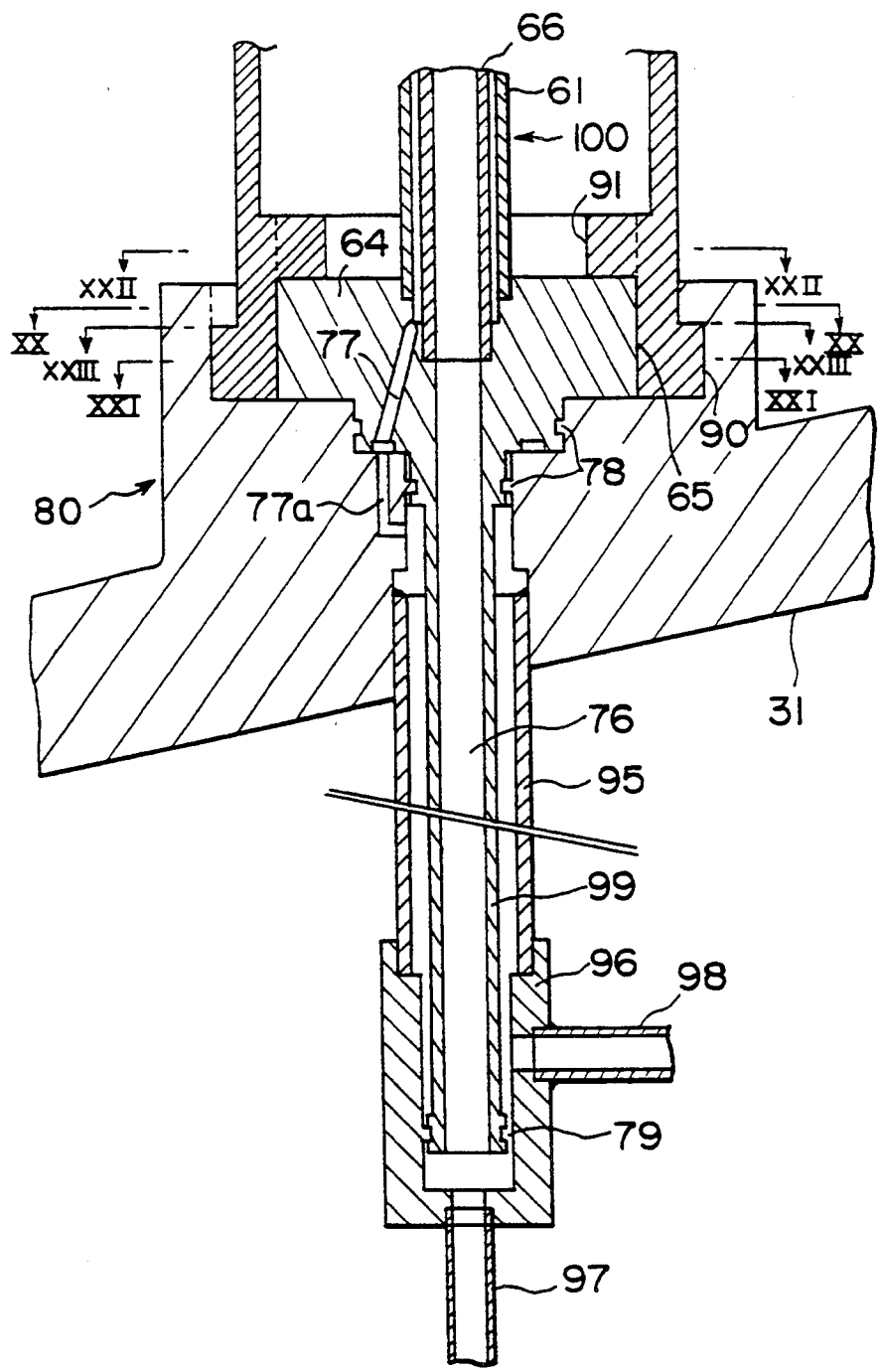
FIG. 19 is an enlarged sectional view of a support portion and a duct connection portion of the control rod driving mechanism of FIG. 15.

A control rod driving mechanism support plate 80 is provided at the inner surface of the bottom portion of the reactor pressure vessel 31, and FIG. 19 shows the detail of this control rod driving mechanism support plate 80. FIGS. 20 to 23 show sectional views of the support plate 80, the control rod guide tube 35, and the control rod driving mechanism 100.

Figure 20:
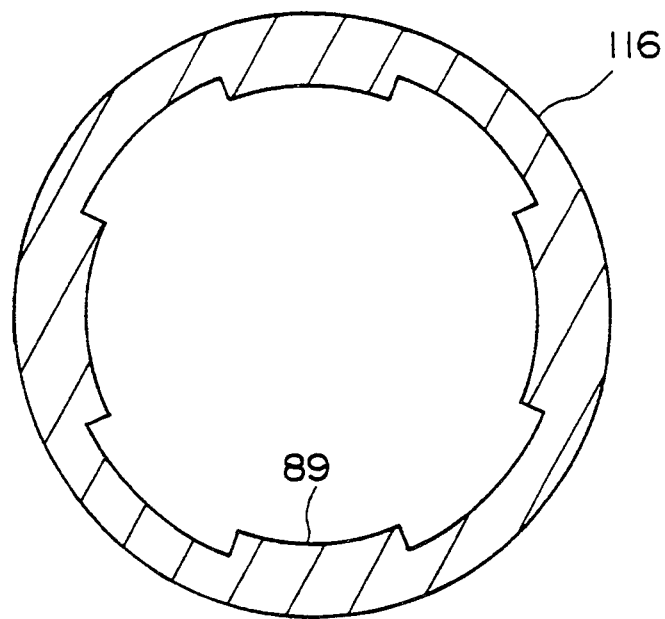
FIGS. 20 to 23 are sectional views taken along the lines XX—XX, XXI—XXI, XXII—XXII and XXIII—XXIII of FIG. 19, respectively.
Figure 21:
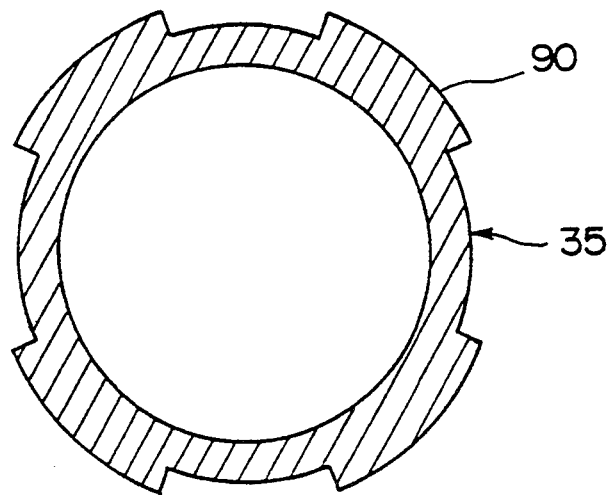

As shown in FIG. 20, a plurality of projections 89 are formed at the upper inside portion of the support plate 80. A plurality of projections 90 are also formed at the lower outside portion of the control rod guide tube 35 as shown in FIG. 21 so as to accord with the projections 89 of the support portion 116. When the control rod guide tube 35 is fitted into the support plate 80 from the upper side thereof and then rotated, the projections 90 of the control rod guide tube 35 are engaged with the support plate 80, thus fixing the control rod guide tube 35 to the support portion 116.

Figure 22:
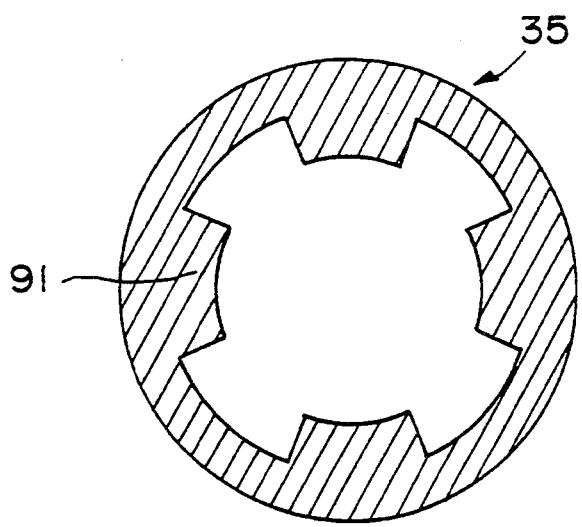
Figure 23:
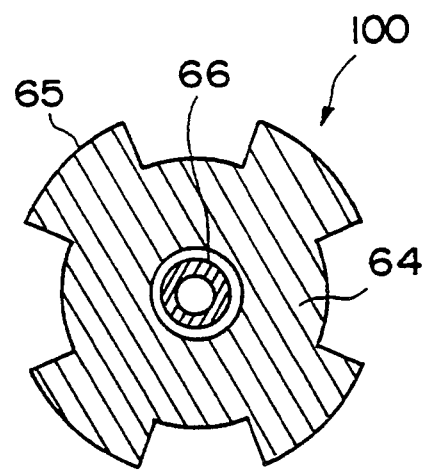

As shown in FIG. 22, a plurality of projections 91 are formed in the lower inside portion of the control rod guide tube 35. A plurality of projections 65 are formed at the outside of the fixing portion 64 of the control rod driving mechanism 100 so as to accord with the projections 91 of the control rod guide tube 35. When the control rod driving mechanism 100 is fitted into the control rod guide tube 35 from the upper side and then rotated, the projections 65 of the fixing portion 64 of the control rod driving mechanism 100 are engaged with the control rod guide tube 35, thus fixing the control rod driving mechanism 100 to the control rod guide tube 35.

As described with reference to FIG. 5 of the first embodiment, the pins 92 are provided at the top end of the control rod guide tube 35, and the pins 93 are also formed in the core support plate 39, both pins 92 and 93 extending vertically upward in the illustration of FIG. 15. The fuel support fitting 37 is mounted by fitting both the pins 92 and 93 to an elongated hole 94 formed in the fuel support fitting 37. In the manner described above, the entire positional relationship is complete.

As shown in FIG. 19, a duct or line 95 is connected to the reactor pressure vessel 31 and a duct connecting member 96 is mounted to the lower end portion of the duct 95. An insertion duct 97 and a withdrawal (latch releasing) duct 98 both connected to a control rod driving water supply system, not shown, are connected to the duct connecting member 96.

As described hereinbefore, the control rod driving mechanism 100 is fixed by fitting the same to the control rod guide tube 35 and then rotating it, but this time, the fixing portion 64 is fitted into the support plate 80 and a portion of the pipe 99 having a shape and function for constituting the insertion passage 76 extends downward from the fixing portion 64 and is accommodated in the duct 95 connected to the reactor pressure vessel 31. The seal ring 79 disposed at the lower end of this pipe 99 has a sealing function for sealing the driving water from the insertion duct 97 in the duct connecting portion 96 and the driving water from the withdrawal duct 98. Furthermore, the control rod driving mechanism support plate 80 is provided with a guide hole 77a for establishing the communication of the driving water from the withdrawal duct 98 to the withdrawal passage 77.

The control rod driving system of the structure described above will attain the following functions.

With reference to FIG. 14, when the control rod 33 is inserted, the driving water flows through the insertion passage 76. The driving water then passes the inner tube 66 and acts on the upper end of the coupling tube 58 to force upward the same and hence force upward the control rod 33. In a reactor emergency stop, i.e. scram, highly-pressurized driving water flows through the insertion passage 76, whereby the control rod 33 is rapidly raised and the coupling tube 58 compresses the spring 72 at the stroke end, thus moderating operation.

When the control rod 33 is lowered downward, it is necessary to disengage the pawl 83, and driving water flows through the withdrawal passage 77 for this purpose. The driving water then passes between the inner tube 66 and the outer tube 61 to act on the piston 74 of the latch releasing mechanism 63 to force upward the piston 74, thus releasing the latched condition in the manner described hereinbefore.

When the control rod is withdrawn, a weak hydraulic pressure is first applied to the insertion passage 76 to slightly lift upward the coupling tube 58. Hydraulic pressure is then applied to the withdrawal (latch releasing) passage 77 to thereby release the engagement of the pawl 83.

In this state, the coupling tube 58 and the control rod 33 are not lowered by the hydraulic pressure in the insertion passage 76, but when the hydraulic pressure in the insertion passage 76 is gradually weakened, the coupling tube 58 is lowered at a low speed by its weight because the vertical movement of the coupling tube 58 is performed relatively smoothly with no large resistance as described above, whereby the control rod 33 can be withdrawn. When the control rod 33 has been withdrawn to a predetermined position, the pawl 83 is engaged with the groove 57 of the coupling tube 58 by weakening the hydraulic pressure now applied to the withdrawal passage 77, thus securing the control rod 33.

A third embodiment according to the present invention will be described hereunder with reference to FIGS. 24 to 29.

Figure 24:
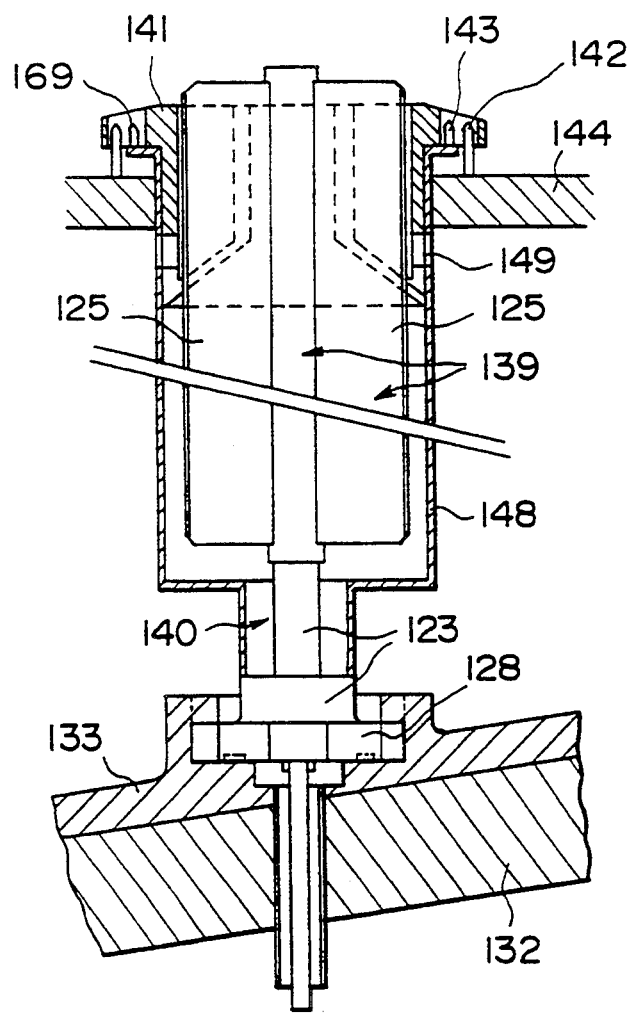
FIG. 24 is an elevational section of a control rod driving mechanism according to a third embodiment of the present invention.
Figure 25:
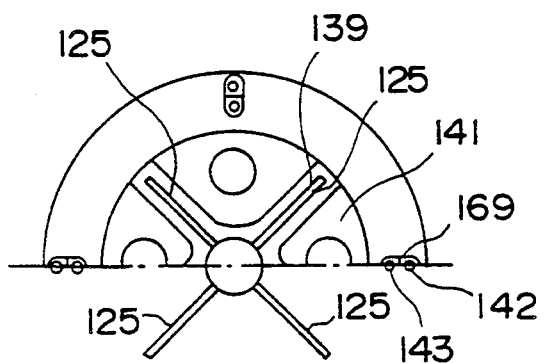
FIG. 25 is an upper end view of FIG. 24, but only a half portion thereof is shown.
Figure 26:
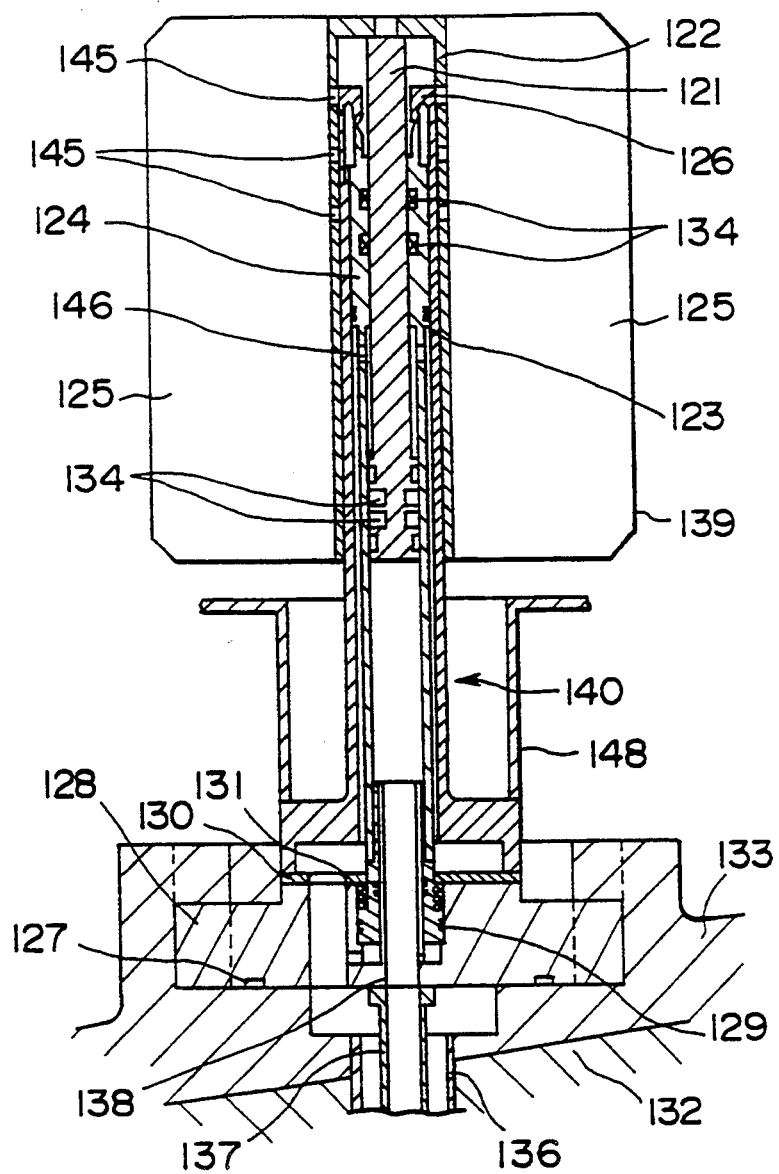
FIG. 26 is an enlarged elevational section of a main operating portion of the embodiment of FIG. 24.

Referring to FIGS. 24 and 25, a control rod 139 is inserted into a control rod guide tube 148, which has an upper portion extending upward, as viewed, through a core support plate 144. To the upper end of the control rod guide tube 148 are provided pins 143 for preventing the rotation thereof and into this is inserted a fuel support fitting 141 in which an elongated hole 169 is formed. Positioning pins 142 are provided for the core support plate 144. An outer tube 123 is connected to a flange 128 which is mounted on a control rod driving mechanism support plate 133. In the illustration, the members or elements except for the control rod 139 and the control rod driving mechanism 140 are shown as sectional views. FIG. 26 is an enlarged sectional view of a main portion of the control rod driving mechanism 140 of FIG. 24.

Referring to FIG. 26, the main portion of the control rod driving mechanism 140 comprises a piston-cylinder mechanism (outer tube 123, inner tube 124 and connection rod 121) for hydraulically driving the control rod 139 and a mechanism (latch 126) for fixing the position of the control rod 139. These mechanisms are accommodated in an absorber attachment pipe 122.

The outer tube 123 has a cylindrical structure and is fastened to the flange 128 through a spring press plate 130 by means of a bolt. The flange 128 is, as shown in FIG. 24, fixed to the control rod driving mechanism support plate 133 in a detachable manner as described hereinafter. The control rod driving mechanism support plate 133 is fixed to the reactor pressure vessel 132 shown in FIG. 24 by means a of bolt, for example. The mating portion of the lower surface of the flange 128 and the surface of the control rod driving mechanism support plate 133 is sealed as shown in FIG. 26 by a core pressure keeping seal ring 127 to thereby maintain an air-tightness of the reactor pressure vessel 132.

The inner tube 124 also has a cylindrical structure having an upper portion contacting the inner surface of the outer tube 123 and the outer surface of the connection rod 121, and this contacting portion is sealed by a seal ring 134, whereby the piston-cylinder mechanism is composed of the outer tube 123, the inner tube 124 and the connection rod 121 to vertically shift the connection rod by the action of the hydraulic pressure.

The latch 126 is a means for fixing the position of the absorber attachment pipe 122, i.e. control rod 139. The latch 126 is secured to the upper end of the outer tube 123 and pressed against the inner surface of the absorber attachment pipe 122 by the spring force of the latch itself. The downward movement of the control rod 139 can be prevented by the engagement of the latch 126 with grooves 145 formed with proper intervals on the inner surface of the attachment tube 122.

In the structure mentioned above, the inner tube 124 is constructed so as to be vertically movable by about several cm through the guidance of the outer tube 123. Although the inner tube 124 is usually pressed downward by the action of the spring 131, when the inner tube 124 is moved upward, the latch 126 is inclined inward thereby to disengage it from the groove 145, thus the control rod 139 being movable in a downward direction. In this operation, the latch 126 does not hinder the upward movement of the control rod 139.

The control rod 139 is connected to the upper end portion of the connection rod 121 driven vertically by means of the piston-cylinder mechanism and the control rod 139 is movable together with the connection rod inward or outward of the core with a stroke of about 4 m. There is adopted a construction in which the connection of the control rod 139 and the connection rod 121 can be released by rotating them relative to each other.

As shown in FIG. 26, the control rod guide tube 148 is secured to the flanged portion formed at the lower portion of the outer tube 123 by means of welding, and the guide tube 148 can be hence handled as a unit together with the control rod driving mechanism 140. A coolant passing hole 149 is opened at the upper portion of the control rod guide tube 148 and a rotation preventing pin 143 is provided on the top portion of the guide tube 148 for preventing the guide tube 148 from rotating.

An insertion tube 137 and a withdrawal tube 136 are constructed as a double wall structure and are secured to the control rod driving mechanism support plate 133 by means of welding, for example. A seal ring 138 is disposed at a portion at which the insertion tube 137 and the lower surface of the flange 128 are contacted so as to prohibit water communication between the insertion tube 137 and the withdrawal tube 136.

A hydraulic pressure is applied to the insertion tube 137 to raise, i.e. insert, the control rod 139, and for this purpose, driving water passes through the connection rod 121 and presses upwardly the upper end of the connection rod 121, thus raising the control rod 139. This operation is performed in the case of reactive adjustment as well as during emergency shut-down period (scram). The raised control rod 139 can be secured at the upper portion by means of the latch 126 as described hereinbefore.

On the contrary, in order to lower the control rod 139, a hydraulic pressure is applied to the withdrawal tube 136, and for this purpose, the driving water is branched so that one portion of the driving water presses upward the piston 129, whereby the inner tube 123 connected to the piston 129 is also raised to thereby incline inwardly the latch 126, thus moving downward the control rod 139. The other portion of the driving water passes between the outer tube 123 and the inner tube 124 and enters between the inner tube 124 and the connection rod 121 through a hole 146 formed in the inner tube 124, whereby the connection rod 121 is depressed downward and the control rod 139 is hence lowered.

When the applied hydraulic pressure is lessened, the piston 129 is first lowered by the action of the spring 131, and the latch 126 is again pressed against the inner surface of the absorber attachment pipe 122, whereby the latch 126 is engaged with the groove 145, thus fixing the control rod 139 to its position.

A mechanism and a method of detachably fixing the control rod driving mechanism to the reactor pressure vessel will be described hereunder.

Figure 27:
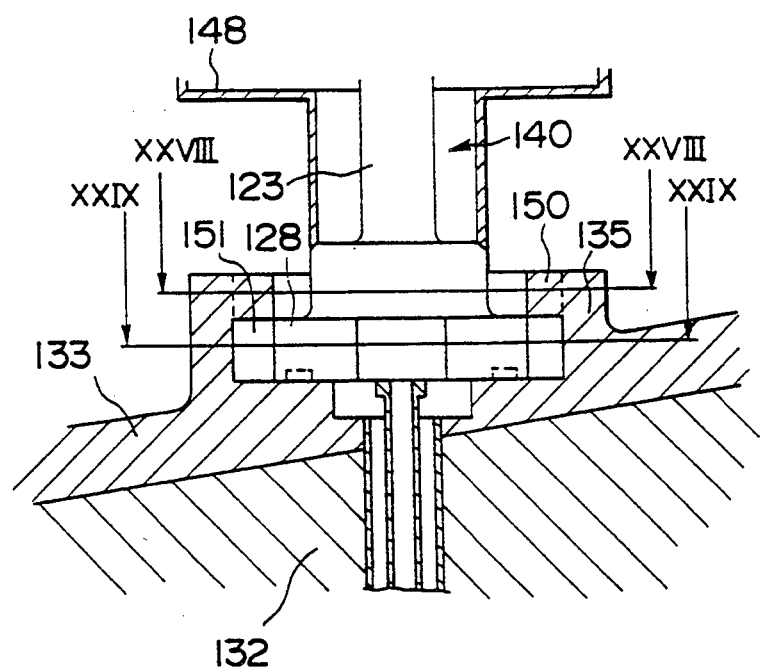
FIG. 27 is a partial sectional view showing a combining condition between the control rod driving mechanism and the reactor pressure vessel of the embodiment of FIG. 24.
Figure 28:
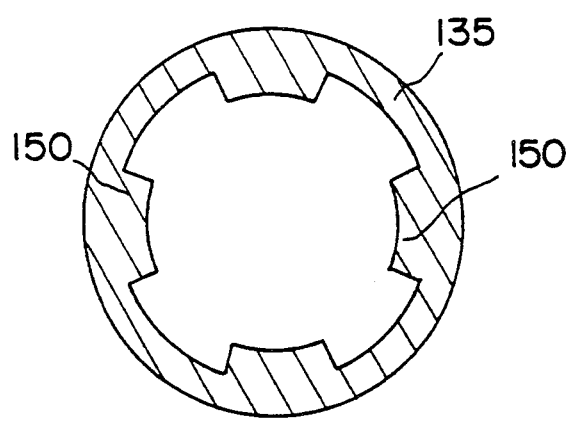
FIG. 28 is a sectional view of a cylindrical connecting member taken along the line XXVIII—XXVIII of FIG. 27.

FIG. 27 is a schematic view showing a condition of the connection of the control rod driving mechanism 140 to the reactor pressure vessel 132, and referring to FIG. 27, members or elements except for the flange 128 and the outer tube 123 are shown with sections. The control rod driving mechanism support plate 133 has a cylindrical connection portion 135. FIG. 28 is a section of this cylindrical connection portion 135, and as shown in FIG. 28, four engaging pawls 150 are provided on the inner surface of the connection portion 135.

Figure 29:
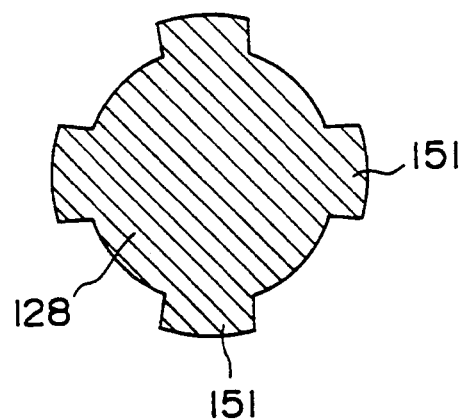
FIG. 29 is a sectional view of a flanged portion taken along the line XXIX—XXIX of FIG. 27.

FIG. 29 is a section of the flange 128, and as shown in FIG. 29, four flange pawls 151 are provided on the side surface of the flange 128. Both pawls 150 and 151 are engaged with each other by fitting the flange 128 to the cylindrical connection portion 135 and rotating the same by about 45°, whereby the control rod driving mechanism 140 and the control rod driving mechanism support plate 133 are also engaged with each other.

As described before, the rotation preventing pin 143 is provided on the top portion of the control rod guide tube 148 as shown in FIG. 24, and the rotation of the control rod driving mechanism 140 can be prevented by mating the pin 143, the elongated hole 169 of the fuel support fitting 141 and the positioning pin 142 of the core support plate 144, whereby the control rod driving mechanism 140 can be completely fixed to the reactor pressure vessel 132.

Referring to FIG. 24, the mounting or dismounting working of the control rod driving mechanism with respect to the reactor pressure vessel will be described hereafter.

Such work is performed from the upper side of the reactor pressure vessel, but it is necessary to perform this work remotely because the reactor pressure vessel is always filled up with the coolant. In the case of the dismounting working, the fuel support fitting is first removed and the control rod guide tube 148 is then grasped by a specific handling machine at the portion of the location of the coolant passing hole 149. The control rod guide tube 148 is then rotated by the handling machine about 45° and lifted up, thus removing the control rod guide tube 148, the control rod 139 and the control rod driving mechanism 140 all together. The mounting work is performed in a manner reverse to that in the dismounting working.

According to the present embodiment, the connection or releasing of the connection between the control rod driving mechanism and the reactor pressure vessel can be performed only by grasping the upper end of the rod guide tube and rotating the same by about 45°, thus making this working simple. This work can be done by lowering the handling machine to the portion of the location of the core support plate. Accordingly, this work will be made under visual control of the worker and the workability of the worker can be hence improved.

Disassembly of the control rod driving mechanism after the removal of the same outside the reactor pressure vessel will be described with reference to FIG. 26. At first, the connection between the connection rod 121 and the absorber attachment pipe 122 is released to take out the control rod 139. The bolt fastening the flange 128 to the outer tube 123 is then removed to separate the flange 128, and hence, the inner tube 124 can be taken out downward together with the connection rod 121 from the inside of the outer tube 123. The connection rod 121 is removed from the inner tube 124 by removing the piston 129 screwed in the inner tube 124.

Figure 30:
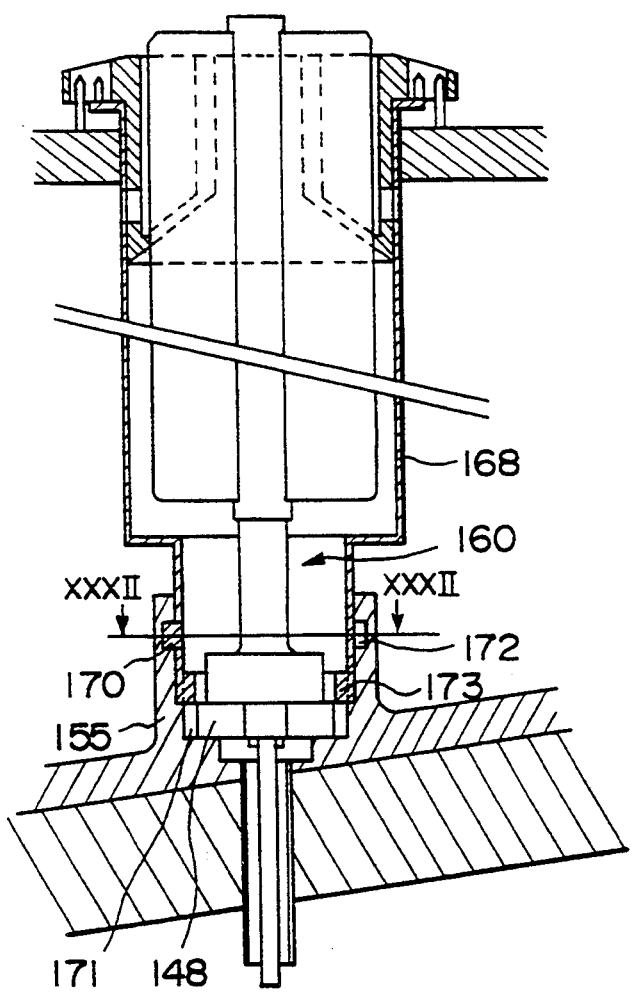
FIG. 30 is an elevational section of a fourth embodiment according to the present invention.
Figure 31:
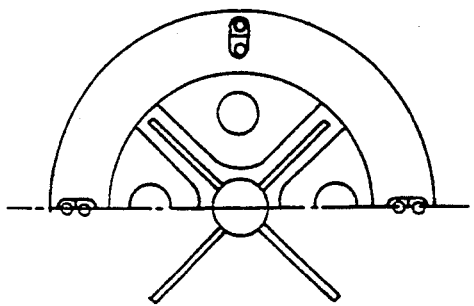
FIG. 31 is an upper end view of FIG. 30, but only a half portion thereof is shown.

A fourth embodiment according to the present invention will be described hereafter with reference to FIGS. 30 to 32.

The control rod driving mechanism of this fourth embodiment is similar to that shown in FIG. 24 in its basic structure, but differs therefrom in that a control rod guide tube 168 is not integral with a control rod driving mechanism 160 and that the fixing method of the control rod driving mechanism 160 to a reactor pressure vessel differs in the fourth embodiment.

Figure 32:
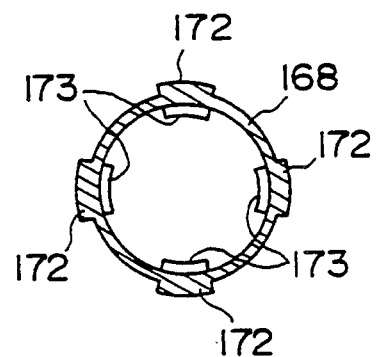
FIG. 32 is a sectional view of a control rod guide tube taken along the line XXXII—XXXII of FIG. 30.

As shown in FIG. 32, four fixing pawls 172 for fixing the guide tube and four fixing pawls 173 for fixing the control rod driving mechanism are provided on the outer and inner surfaces of the lower portion of the control rod guide tube 168. Further four connection pawls 170 are provided to the inner surface of the connecting portion and four flange pawls 171 are provided on a flange 148. The shapes of the connection pawls 170 and the flange pawls 171 are substantially the same as those of the third embodiment. When the control rod driving mechanism 160 and the control rod guide tube 168 are fitted to the connection portion 155 and the control rod guide tube 168 is then rotated by about 45°, the guide tube fixing pawls 172 and the connection pawls 170 are engaged thereby to fix the control rod guide tube 168. At the same time, the driving mechanism fixing pawls 173 and the flange pawls 171 are also engaged to thereby fix the control rod driving mechanism 160.

According to this fourth embodiment, as in the third embodiment, the connection and releasing of the control rod driving mechanism can be performed only by grasping the upper end portion of the control rod guide tube and rotating the same by about 45°. In the fourth embodiment, furthermore, the control rod driving mechanism 160 and the control rod guide tube 168 can be removed independently outwardly of the core.

The control rod guide tube has a simple structure which does not require any periodic maintenance. In this embodiment, accordingly, only the control rod driving mechanism can be removed from the reactor with the control rod guide tube remaining therein at a periodical inspection of the control rod driving mechanism, thus positively eliminating the possibility of irradiation of an exposure dose to workers, when compared with the aforementioned embodiments.

Figure 33:
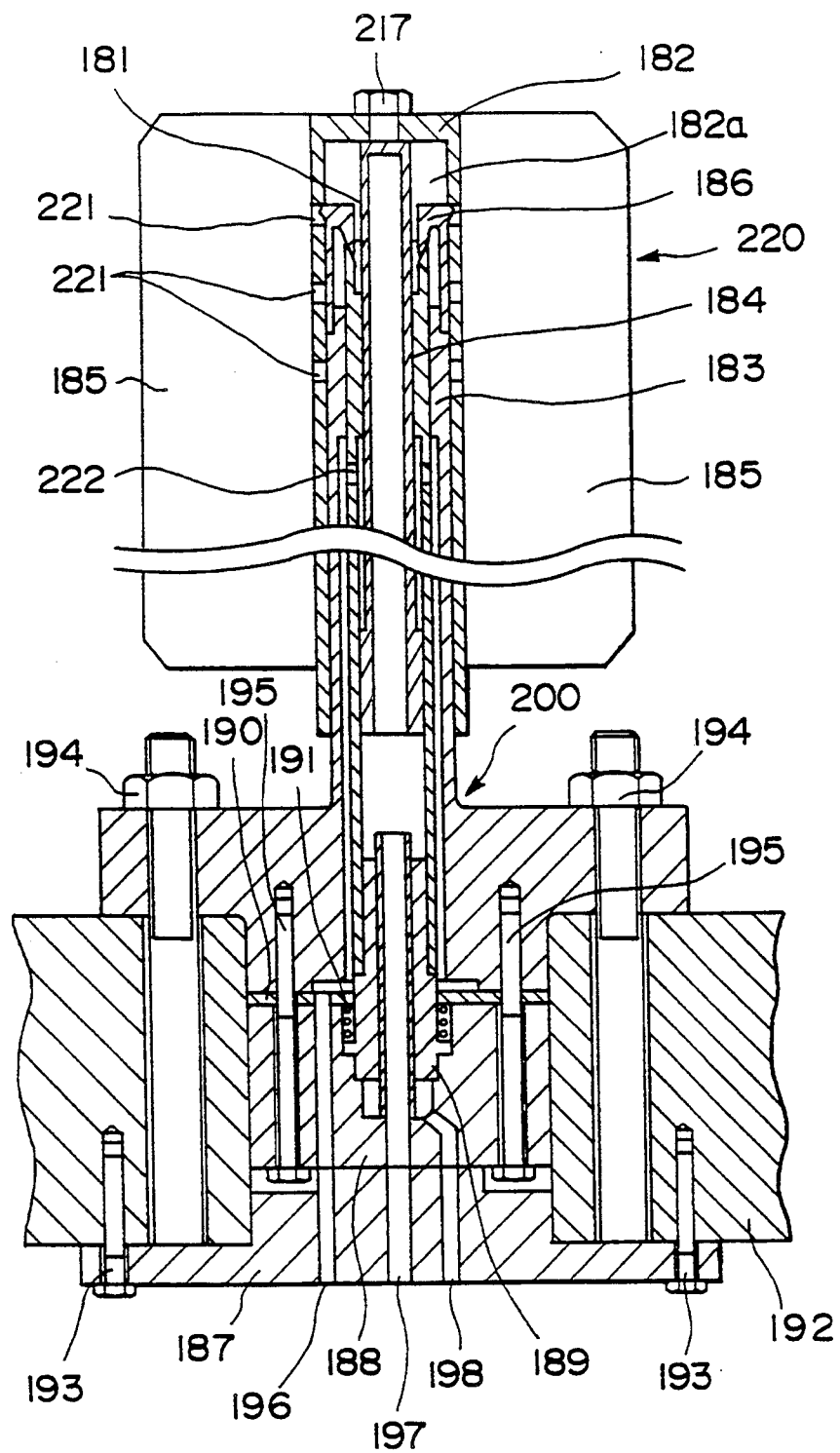
FIG. 33 is an elevational section of a fifth embodiment according to the present invention.

FIG. 33 is an elevation of a fifth embodiment according to the present invention.

Referring to FIG. 33, in the inside of an absorber attachment pipe 182, there are accommodated a piston-cylinder mechanism (piston 189, outer tube 183, inner tube 184, connection tube 181) for hydraulically driving a control rod 220 and a control rod fall-down prevention mechanism (collet finger). The outer tube 183 is provided with a flanged portion which is detachably fixed to the lower portion of a reactor pressure vessel 192 by means of bolt and nut assembly 194. A lower cover or plug 187 is fixed to the reactor pressure vessel 192 by means of bolts 193. The contacting portion between the flanged portion of the outer tube 183 and the reactor pressure vessel 192 and the connecting portion between the lower plug 187 and the reactor pressure vessel 192 are both sealed by means of seal rings, not shown, to thereby keep an air-tight condition against the pressure difference between the inside and outside of the reactor pressure vessel 192. An intermediate cover or plug 188 is fixed to the outer tube 183 through a spring press plate 190 by means of a bolt 195.

In the structure mentioned above, the inner tube 184 is constructed to be vertically movable by about several cm through the guidance of the outer tube 183. The piston 189 is screwed in the inner tube and the piston 189 is pressed downward by the action of the spring 191. The control rod 220 is connected through a bolt means 217 to the connection tube 181 driven vertically by the actuation of the piston-cylinder mechanism, whereby the control rod 220 is movable together with the connection tube 181 towards or away from the core with a stroke of about 4 m.

There are provided one sliding surface between the outer tube 183 and the inner tube, two sliding surfaces between the inner tube 184 and the connection tube 181 and one sliding surface between the intermediate plug 188 and the piston 189. These sliding surfaces are sealed by seal rings to keep air tight. Further, there is no sealing structure between the absorber attachment pipe 182 and the outer tube 183.

A hydraulic pressure is applied to an insertion tube 197 to raise, i.e. insert, the control rod 220, and for this purpose, driving water passes through the connection tube 181 and presses upwardly the same, thus raising the control rod 220. This operation is done in the case of reactivity adjustment as well as for emergency shut-down periods (scram). The raised control rod 220 can be secured to the upper portion by means of the collet finger 186. The collet finger 186 is secured to the outer tube 183 and pressed against the inside of the absorber attachment pipe 182 by its own elasticity. A plurality of grooves 221 are cut in to the absorber attachment pipe 182 at axially predetermined spaces, and the control rod 220 can be secured at its position by the engagement of the collet finger 186 with the grooves 221.

When withdrawal, i.e. lowering is required, for the control rod 220, a hydraulic pressure is applied to a withdrawal tube 196 and a collet finger disengaging duct 198. The hydraulic pressure applied on the collet finger disengaging duct 198 acts to press upward the piston 189 and hence the inner tube 184 connected thereto to thereby incline inside the collet finger 186, whereby the connection between the collet finger 186 to the grooves 221 of the absorber attachment pipe 182 can be disengaged. The water acting on the withdrawal duct 196 passes between the outer tube 183 and the inner tube 184 and enters between the inner tube 184 and the connection tube 181 through a hole 222 formed in the inner tube 184, whereby the hydraulic pressure is then applied to the connection tube 181 to depress the same to thereby lower the control rod 220.

When the control rod 220 is lowered to a proper position, the hydraulic pressure applied on the collet finger disengaging duct 198 is weakened, and then the piston 189 is shifted downward by the force of the spring 191, thereby returning the collet finger 186 again to its original position. The grooves 221 of the absorber attachment pipe 182 are then engaged with the collet finger 186, thus stopping the movement of the control rod 220.

The dismounting of the control rod 220 and the control rod driving mechanism 200 from the reactor pressure vessel 192 will be performed in the following manner. The upper portion above the intermediate plug 188 can be removed from the upper side of the reactor pressure vessel 192 by loosening and removing the bolt 194. At this time, since the lower plug 187 remains as it is, the air tightness inside the reactor pressure vessel 192 can be maintained. Next, the connection between the connection tube 181 and the absorber attachment pipe 182 is disengaged by removing the nut 217. In thus manner, the control rod 220 is then removed.

The intermediate plug 188 is separated by removing the bolt 195, and the inner tube 184 together with the connection tube 181 can be thereby removed downward from the inside of the outer tube 183. The connection tube 181 can then be separated from the inner tube 184 by removing the piston 189 screwed in the inner tube 184. The mounting of the control rod 220 and the control rod driving mechanism 200 is performed in the order reverse to that described above.

In the described manner, the control rod 220 and the control rod driving mechanism 200 can be mounted to or dismounted from the reactor pressure vessel 192 from the upper side thereof.

FIGS. 34 to 37 represent a sixth embodiment according to the present invention.

Figure 34:
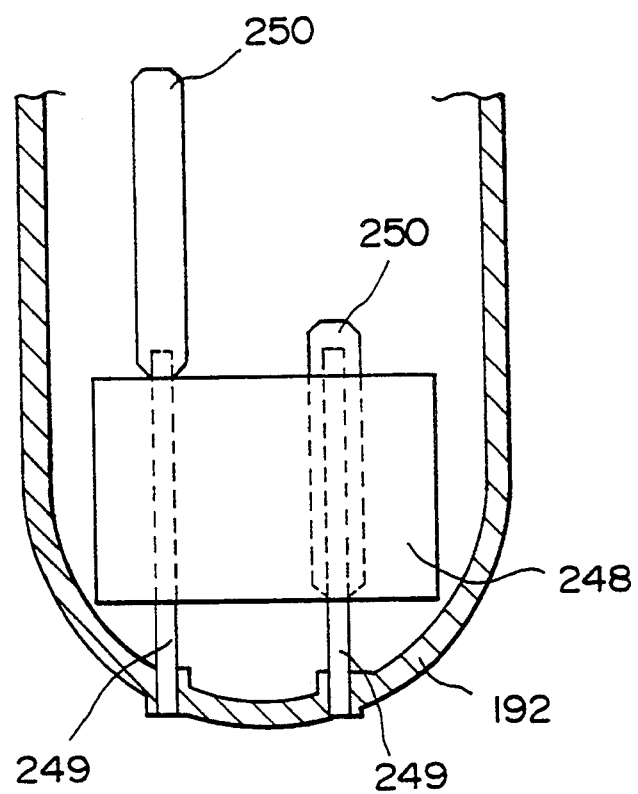
FIG. 34 is a schematic elevation of a sixth embodiment according to the present invention.

Referring to FIG. 34, in this embodiment, a control rod 250 is inserted from the upper side of a core 248 so as to be applied to an arrangement in which a control rod driving mechanism 249 is positioned on the lower side of the core 248.

Figure 35:
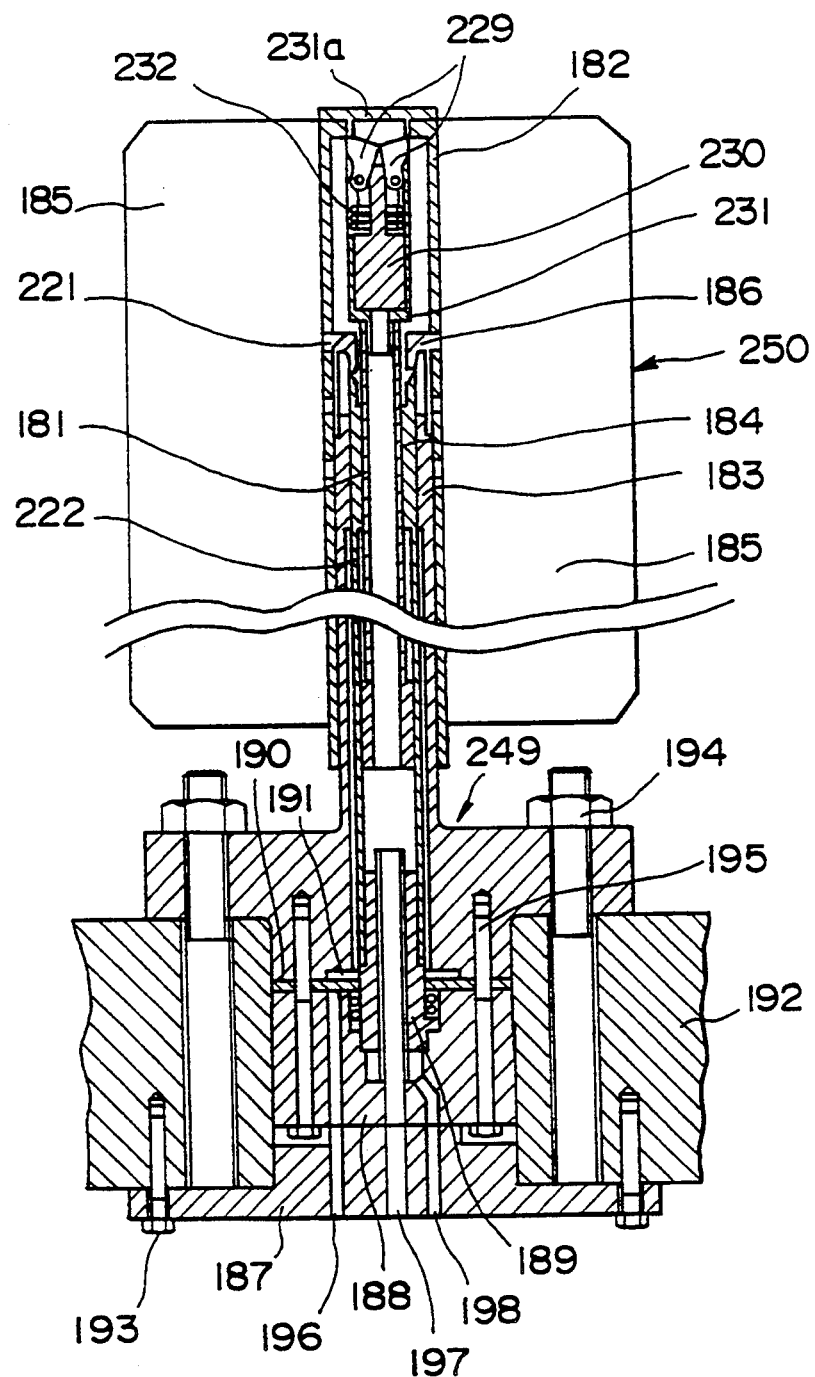
FIG. 35 is a detailed elevational section of the control rod driving system of FIG. 34.

This sixth embodiment will be described in detail with reference to FIG. 35, in which like reference numerals are added to members or elements corresponding to those shown in FIG. 33.

The arrangement of the control rod 250 and the control rod driving mechanism 249 in the reactor pressure vessel 192 is shown in FIG. 34, in which the control rod driving mechanism 249 vertically extends so as to penetrate through the core 248, and the control rod 250 is positioned at the upper portion of the core 248 in the most extended condition as shown on the lefthand side of FIG. 34 and positioned in the core in the most contracted condition as shown on the righthand side thereof. Namely, in this embodiment, a control rod upper side insertion system is adopted.

The control rod driving mechanism has a similar structure in basic construction to that of FIG. 33, but has some differences. One typical advantage of the control rod upper side insertion system resides in that, at the emergency insertion (scram) of the control rod into the core, the gravity of the control rod itself can be utilized. On the contrary, in the control rod driving mechanism shown in FIG. 33 in which the control rod is moved together with the connection tube, a sufficient insertion speed may not be obtained by only the gravity of the control rod because of friction on the sealing surface of the connection tube. In order to solve this problem, in this embodiment, upon scram, only the control rod is allowed to fall down by removing the connection between the connection tube and the control rod.

One difference in the construction between the control rod driving mechanism of this sixth embodiment from the aforementioned fifth embodiment resides in The location of a cylindrical latch box 231 attached to a portion between the connecting portion of the connection tube 181 and the absorber attachment pipe 182 and the upper end of the connection tube 181. This latch box 231 is screwed in the connection tube 181, and a latch 229, a latch piston 230 and a spring 232 are accommodated in the latch box 231. The connection tube 181 and the absorber attachment pipe 182 are not secured. The latch box 231 has an expanded upper flat portion 231a which is mounted on the upper end of the absorber attachment pipe 182 and constitutes a latch mechanism to be engaged with the latch 229. The absorber attachment pipe 182 follows up the lower movement of the connection pipe 181, but does not follow up the usual upper movement of the latch 229.

Figure 36:
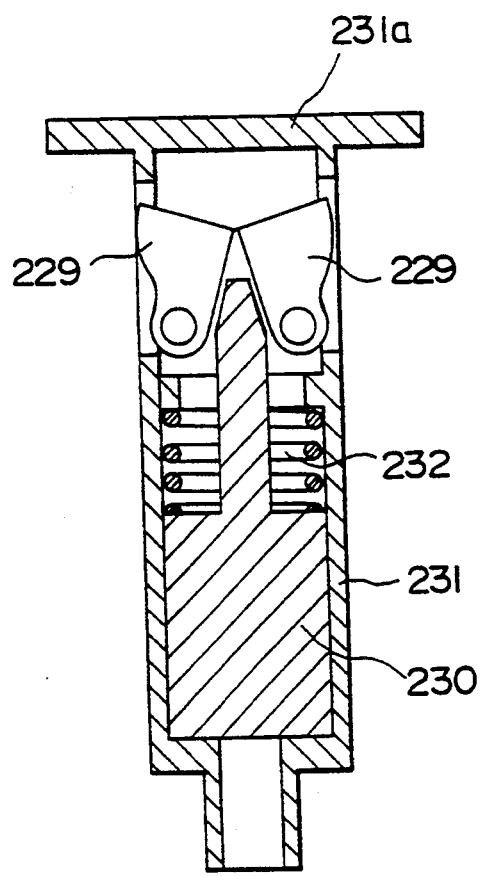
FIG. 36 is an elevation of a latch mechanism of FIG. 35 in an ordinary state.
Figure 37:
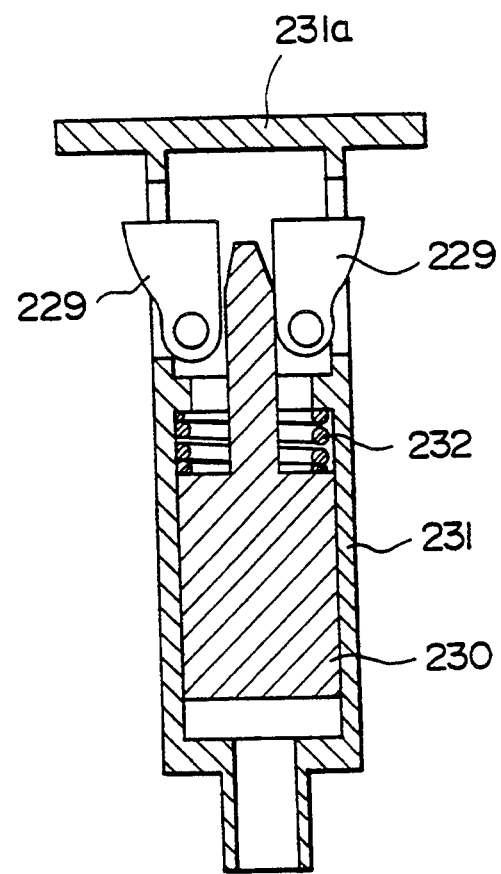
FIG. 37 is a view similar to that of FIG. 36, but showing a condition in which a hydraulic pressure is applied to the latch mechanism.

During ordinary operation, the latch 229 is retracted as shown in FIG. 36 by the action of a spring, not shown, and the latch piston 230 is usually depressed downward by the action of the spring 232. When hydraulic pressure is applied to the insertion tube 197, the latch piston 230 is shifted upwardly and the latch projects outward as shown in FIG. 37 to engage the absorber attachment pipe 182, whereby it moves upwardly.

The withdrawal, i.e. raising, of the control rod 250 is performed by applying hydraulic pressure to the insertion tube 197. As described before, since the latch 229 projects outwardly, the connection tube 181 is moved upwards together with the control rod 250. The fixing of the control rod 250 to the upper portion is performed by the collet finger 186 in the manner identical to the case of FIG. 33.

In the case where it is required to rapidly insert the control rod, the collet finger 186 is released by applying hydraulic pressure to the collet finger disengaging duct 198. At this time, since hydraulic pressure is not applied to the insertion tube 197, the latch 229 maintains its inwardly retracted position, and accordingly, no means hinders the falling down of the absorber attachment pipe 182, and the control rod can be inserted by gravity with the connection pipe 181 remaining at the upper portion.

In order to lower the control rod 250 into the core for reactivity adjustment during ordinary operation, hydraulic pressure is first applied to the insertion tube 197 to make the latch 229 project outwardly. Next, the hydraulic pressure is further applied to the collet finger disengaging duct 198 with the hydraulic pressure being applied to the insertion tube 197, thereby releasing the collet finger 186. Although the control rod 250 and the connection tube 181 fall down together by gravity, they are not rapidly lowered as at scram time because the hydraulic pressure is applied to the insertion tube 197.

The upper side insertion system provides such advantages as utilizing gravity at the time of scram and so there is no need for providing a through hole to the bottom portion of the reactor pressure vessel 192. However, in a case where this system is applied to a BWR, there is a problem, in the prior art technology, such that the control rod interferes with a gas-water separator and a steam dryer which are disposed on the upper portion of the core. However, such a problem can be solved by the present invention in which the control rod driving mechanism is disposed inside or in a lower portion of the core. Thus, the present invention can be, applied to the upper side insertion system as described hereinabove.

Figure 38:
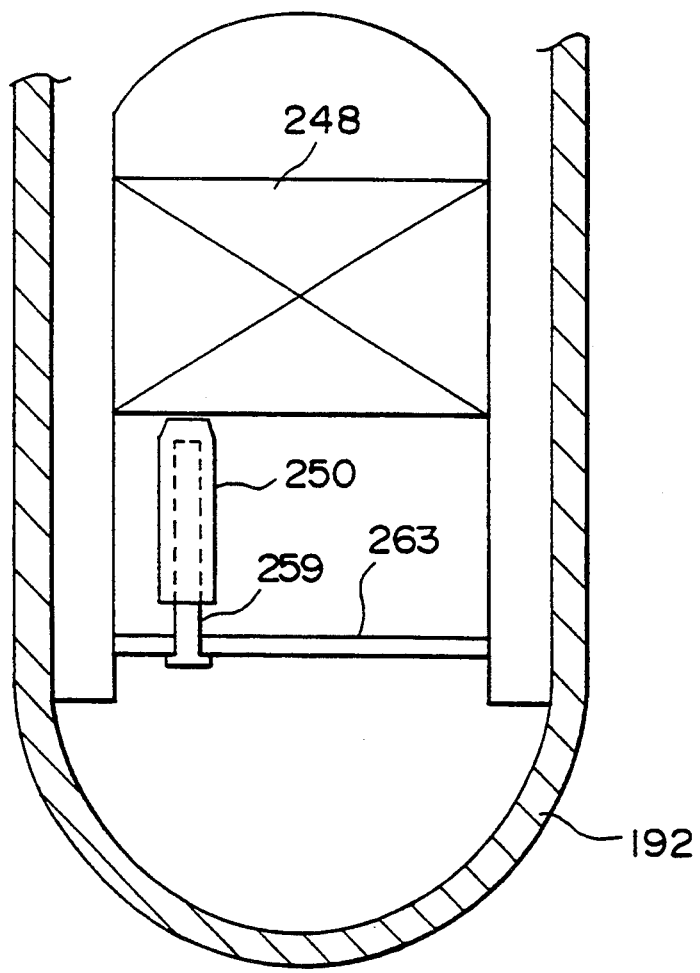
FIG. 38 is a schematic elevation of a seventh embodiment according to the present invention.
Figure 39:
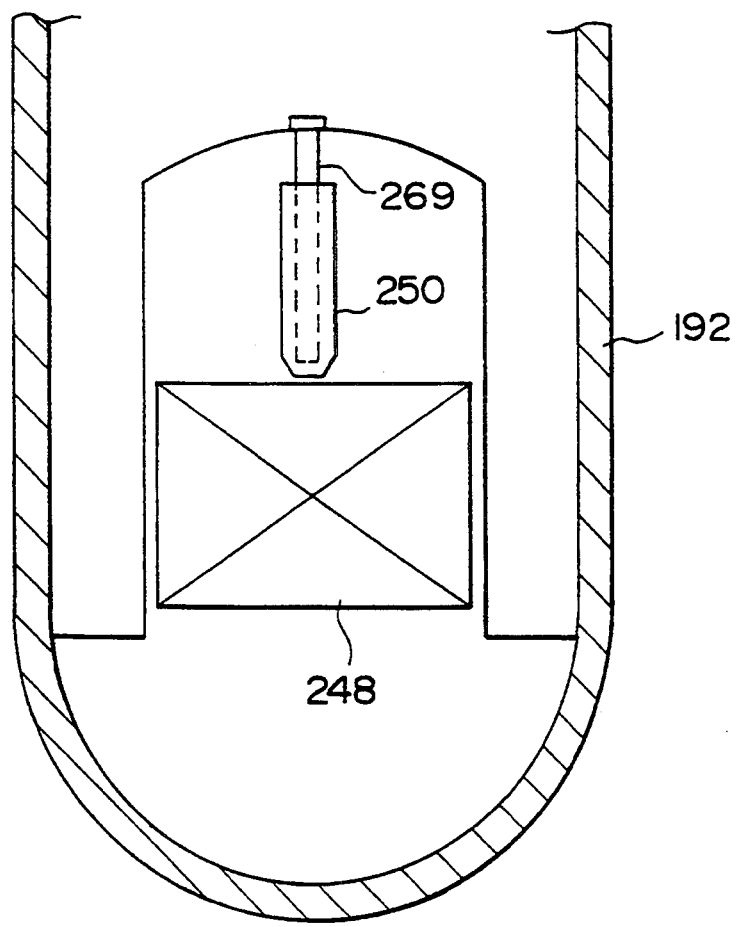
FIG. 39 is a schematic elevation of a eighth embodiment according to the present invention.
Figure 40:
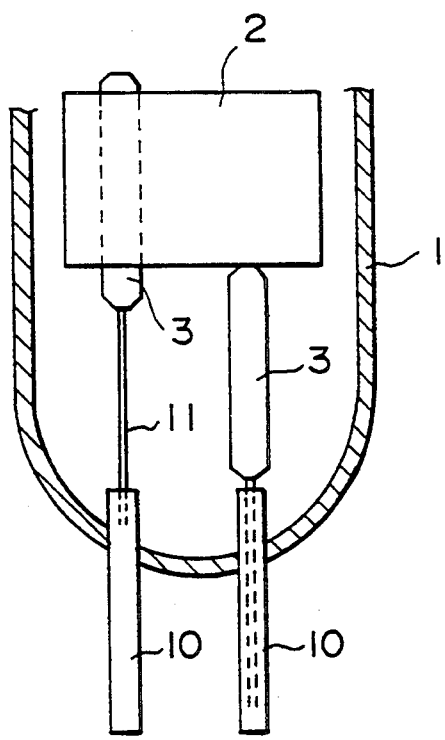
FIG. 40 is a schematic illustration showing an arrangement in which a conventional control rod driving mechanism is disposed in a reactor pressure vessel.
Figure 41:
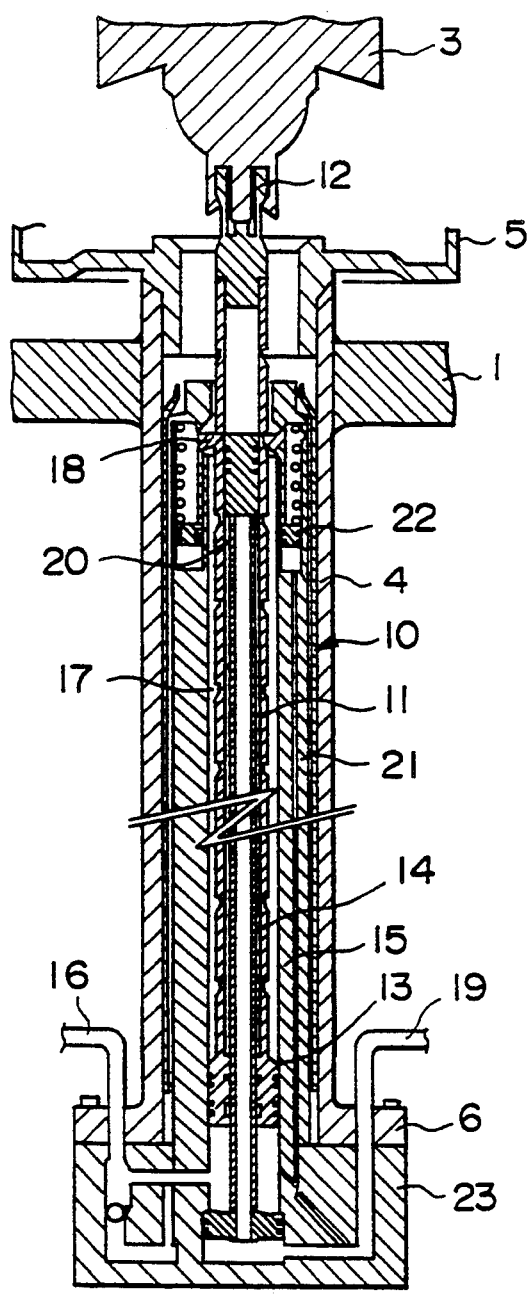
FIG. 41 is a sectional view of the control rod driving mechanism of FIG. 40.
Figure 42:
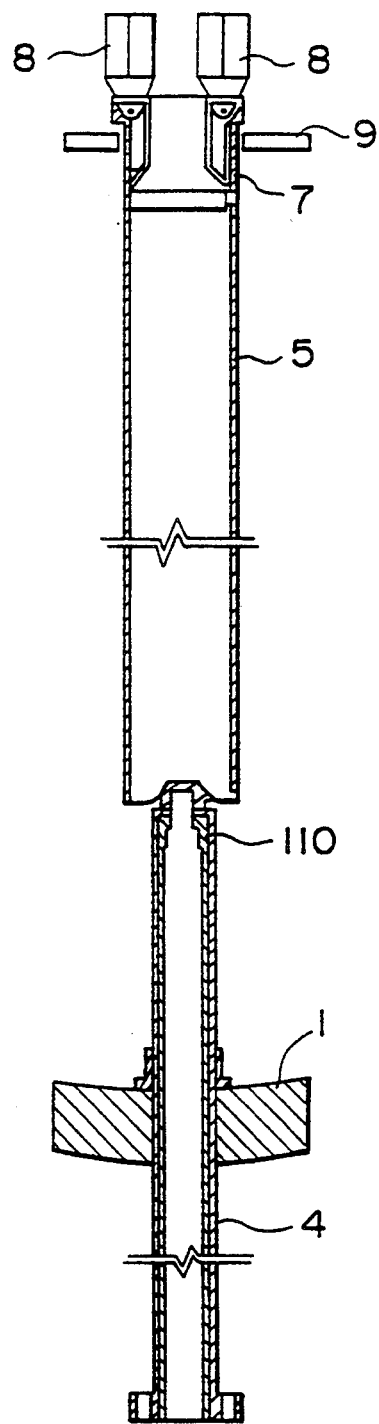
FIG. 42 is an elevational section showing a control rod guide tube and associated members of FIG. 40.
Figure 43:
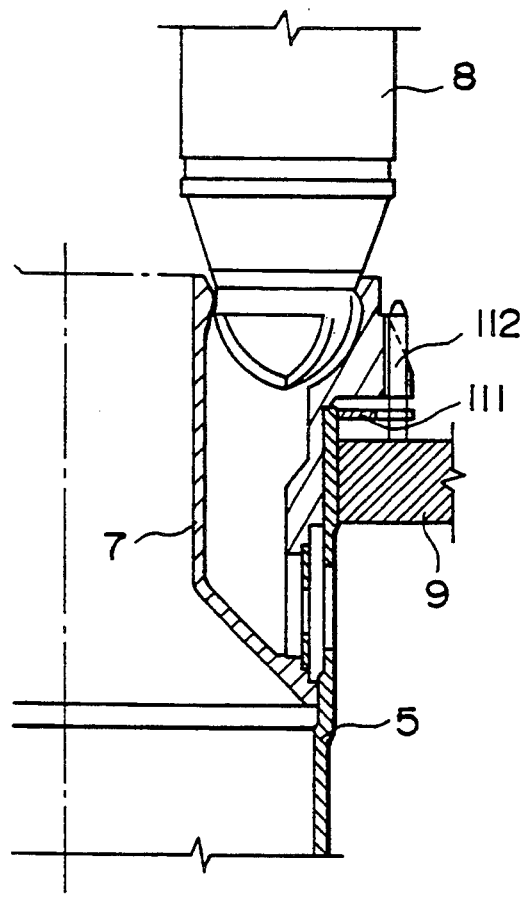
FIG. 43 is an enlarged view, partially cut away, of a core peripheral arrangement of FIG. 42.

It is to be noted that the present invention is not limited to the described preferred embodiments and many other changes or modifications may be made without departing from the scope of the appended claims. For example, in a modification of FIG. 38, a control rod driving mechanism support plate 263 is disposed between a core 248 and a reactor pressure vessel at which a control rod driving mechanism 259 is supported. In this case, the reactor pressure vessel 192 is provided at its lower portion with no through hole. In another modification of FIG. 39, a control rod driving mechanism is supported at an upper portion of the core 248, wherein a control rod can be inserted downwardly into the core from the upper side thereof.

What is claimed is:

1. A control rod driving system for controlling a nuclear reactor core disposed in a reactor pressure vessel comprising:
   a control rod comprising a cylindrical tube having an inner hollow portion extending axially thereof and a neutron absorber means mounted on an outer surface of the cylindrical tube, the neutron absorber means having a crossing blade shape; and
   a control rod driving mechanism to be inserted in to the inner hollow portion of said control rod to drive the control rod wherein said control rod driving mechanism is provided with a piston-cylinder mechanism driven by hydraulic means and wherein said control rod driving mechanism is disposed in the reactor pressure vessel.

2. A control rod driving system according to claim 1, wherein said control rod driving mechanism is arranged on a lower side of the reactor core.

3. A control rod driving system according to claim 2, wherein said control rod is inserted, upwardly in an installed state, into the reactor core from the lower side of the reactor core.

4. A control rod driving system according to claim 2, wherein said control rod is inserted, downwardly in an installed state, into the reactor core from an upper side of the reactor core.

5. A control rod driving system according to claim 1, wherein said control rod driving mechanism is arranged on an upper side of the reactor core and said control rod is inserted downwardly, in an installed state, into the reactor core from the upper side of the reactor core.

6. A control rod driving system according to claim 1, wherein said control rod comprises upper and lower, in an installed state, cylindrical fixing members defining both axial ends of the control rod and wherein said neutron absorber means is secured at upper and lower ends to outer portions of the upper and lower cylindrical fixing members, respectively, an axial portion between said upper and lower fixing members defining said inner hollow portion.

7. A control rod driving system according to claim 6, wherein said control rod driving mechanism comprises a hollow cylindrical coupling means having an outer surface on which a plurality of ring-shaped grooves are formed along an axial direction with a predetermined interval and a latch means to be engaged with the ring-shaped grooves of said coupling means, said coupling means being driven by hydraulic means and said coupling means being inserted into a substantially central portion of the control rod.

8. A control rod driving system according to claim 7, wherein said latch means is provided with pawl means to be engaged with said ring-shaped grooves of the coupling means.

9. A control rod driving system according to claim 7, wherein said control rod driving mechanism further comprises an outer tube on which said coupling means is mounted, an inner tube, disposed inside the outer tube and a latch releasing means connected to the outer tube for releasing a latch engagement of said latch means.

10. A control rod driving system according to claim 9, wherein said outer tube and said inner tube are fixed at lower ends to a fixing member of the control rod driving mechanism.

11. A control rod driving system according to claim 10, further comprising a control rod guide means into which said control rod driving mechanism is arranged wherein said control rod guide means has a lower end detachably secured to a bottom surface of the reactor pressure vessel and wherein said guide means is provided with an inner projected portion and said fixing member is provided with an outer projected portion which is engaged with the inner projected portion of said guide means when said fixing member is inserted into said guide means.

12. A control rod driving system according to claim 1, further comprising a control rod guide means into which said control rod driving mechanism is arranged wherein said control rod guide means has a lower end detachably secured to a bottom surface of the reactor pressure vessel.

* * * * *